(12) United States Patent
Dunn et al.

(10) Patent No.: US 9,727,831 B2
(45) Date of Patent: Aug. 8, 2017

(54) METHODS FOR PROMPTING A USER TO USE ENHANCED AUTOMATION SYSTEM FEATURES, AND SYSTEMS AND DEVICES RELATED THERETO

(71) Applicant: Vivint, Inc., Provo, UT (US)

(72) Inventors: Alex J. Dunn, Orem, UT (US); James E. Nye, Alpine, UT (US); Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 60 days.

(21) Appl. No.: 14/206,755

(22) Filed: Mar. 12, 2014

(65) Prior Publication Data

US 2014/0266719 A1    Sep. 18, 2014

Related U.S. Application Data

(60) Provisional application No. 61/790,868, filed on Mar. 15, 2013.

(51) Int. Cl.
| | |
|---|---|
| *G08B 13/00* | (2006.01) |
| *G06Q 10/06* | (2012.01) |
| *G06F 9/44* | (2006.01) |
| *G06F 9/445* | (2006.01) |
| *G05B 9/02* | (2006.01) |

(Continued)

(52) U.S. Cl.
CPC ......... *G06Q 10/06* (2013.01); *H04L 12/2825* (2013.01); *H04L 12/2829* (2013.01); *G08B 25/14* (2013.01); *H04L 2012/2841* (2013.01)

(58) Field of Classification Search
USPC ..... 340/541, 13.22, 501; 717/173, 168, 174, 717/101; 700/79
See application file for complete search history.

(56) References Cited

U.S. PATENT DOCUMENTS

| | | |
|---|---|---|
| 6,192,282 B1 | 2/2001 | Smith et al. |
| 7,053,764 B2 | 5/2006 | Stilp |

(Continued)

FOREIGN PATENT DOCUMENTS

| | | |
|---|---|---|
| KR | 10-2006-0109284 | 10/2006 |
| WO | 2008155545 | 12/2008 |

OTHER PUBLICATIONS

International Search Report and Written Opinion of the International Searching Authority, PCT/US2014/025496, issued on Jun. 26, 2014.

*Primary Examiner* — Jack K Wang
(74) *Attorney, Agent, or Firm* — Holland & Hart, LLP

(57) ABSTRACT

A control panel is used to control and/or monitor an automation system. The automation system may also be used in connection with one or more enhanced services, such as a remote access service. The remote access service may allow a user to control or monitor some or all aspects of the automation system through a remote computing device. To use the remote access service, or other enhanced services, the user may register to associate the user with the control panel of the automation system. If it is determined that the user has not registered, the service provider may send a message to the control panel. The message may prompt the user to register for the enhanced service. Optionally, contact information may be requested to allow a message to be sent to a personal device of the user to facilitate registration or use of the enhanced service.

18 Claims, 10 Drawing Sheets

(51) Int. Cl.
　　*G08B 23/00* (2006.01)
　　*G08C 19/12* (2006.01)
　　*G08B 25/14* (2006.01)
　　*H04L 12/28* (2006.01)

(56) References Cited

U.S. PATENT DOCUMENTS

| | | |
|---|---|---|
| 7,113,090 B1 | 9/2006 | Saylor et al. |
| 7,478,381 B2 | 1/2009 | Roberts et al. |
| 8,331,544 B2 | 12/2012 | Kraus et al. |
| 2007/0093234 A1* | 4/2007 | Willis ................ G06F 21/6245 455/410 |
| 2009/0058630 A1 | 3/2009 | Friar et al. |
| 2010/0131084 A1 | 5/2010 | Van Camp |
| 2010/0295656 A1* | 11/2010 | Herickhoff ............ H04L 63/08 340/3.1 |
| 2010/0330985 A1 | 12/2010 | Addy |
| 2012/0036442 A1 | 2/2012 | Dare et al. |
| 2012/0062370 A1* | 3/2012 | Feldstein ............... G06F 1/1626 340/13.22 |
| 2012/0280790 A1* | 11/2012 | Gerhardt ............ G07C 9/00309 340/5.61 |
| 2013/0058467 A1* | 3/2013 | Orellana ............... H04M 7/009 379/93.01 |
| 2013/0097317 A1* | 4/2013 | Sheleheda ............ H04W 4/005 709/225 |
| 2013/0215902 A1* | 8/2013 | Lamb .................... H04L 12/462 370/401 |
| 2013/0331098 A1* | 12/2013 | Balasubramaniyan H04W 48/16 455/434 |
| 2014/0091923 A1* | 4/2014 | Heninwolf .......... H04L 12/2823 340/539.11 |
| 2014/0266669 A1* | 9/2014 | Fadell ................. G05B 19/042 340/501 |
| 2014/0266684 A1* | 9/2014 | Poder ................... G08B 25/003 340/521 |
| 2015/0085823 A1* | 3/2015 | Jain ....................... H04W 36/18 370/331 |

* cited by examiner

METHODS FOR PROMPTING A USER TO USE ENHANCED AUTOMATION SYSTEM FEATURES, AND SYSTEMS AND DEVICES RELATED THERETO

CROSS-REFERENCE TO RELATED APPLICATIONS

This application claims the benefit of U.S. Provisional Patent Application No. 61/790,868 entitled "Methods For Prompting A User To Use Enhanced Automation System Features, And Systems And Devices Related Thereto," filed on Mar. 15, 2013, which is assigned to the assignee hereof.

TECHNICAL FIELD

The present disclosure relates to automation systems. More particularly, embodiments of the present disclosure relate to the use of an automation system to monitor a building or other location, and to providing expanded services related to the automation system. More particularly still, embodiments of the present disclosure relate to following-up with users of an automation system who do not register or otherwise take advantage of expanded services related to an automation system.

BACKGROUND

People are increasingly interested in providing security and security services to various locations, building, etc. Security in a home setting, for example, may be particularly significant for a home owner or resident who is away from home, who has small children, or who keeps valuable items at the home. For such an owner or resident to feel secure, security and privacy may be provided through various security mechanisms. Example mechanisms and methods include using door and window locks, the use of video security cameras, or intrusion detection security systems. Some or all of these components may be automated, and potentially included as part of an automation system associated with one or more other functions.

In general, an automation system may include multiple sensors that can be used to detect particular events, and to potentially control different devices. A door or window lock may include a sensor to detect an unauthorized entry. Other sensors may detect a water leak, and potentially shut-off a water supply in response to the detected water leak. Other sensors may detect smoke or carbon monoxide, control lighting or heating elements, or have other purposes or capabilities.

A control panel may provide centralized control of the automation system and its various components or systems. If a security-related or other event is detected by the automation system, information about the event can be relayed to the control panel. The control panel may take appropriate action, such as sounding an alarm, deactivating or activating another portion of the automation system, or displaying information on a display of the control panel. The control panel may also send a message or information to an emergency responder, a network monitoring system, or some other remote location. The control panel may also be used to cause a sensor or system component to take a specified action. For instance, a home or business owner may be able to arm or disarm a security system, change temperature settings, turn lights on or off, or perform other actions.

In some cases, a provider of home automation system services may make expanded services available to the user. An example service may include a web portal through which a user can interact with an automation system. Using the web portal, the user may be able to perform some of the functions that may be performed using the control panel. The user may thus be able to monitor or change settings of the automation system through a computing device, smart phone, or other device, whether the user is within the monitored location, or remote therefrom.

SUMMARY

In accordance with aspects of the present disclosure, embodiments of methods, systems, software, control panels, computer-readable media, and the like are described that relate to security systems and other types of automation systems. In accordance with some embodiments of the present disclosure, a security or automation system may be used in connection with enhanced services. An example of an enhanced service may include a remote access service through which a user may interact with the automation system using a computing device that is remote from the automation system, or otherwise not directly a part of the automation system. A user may register to use the enhanced service. An example registration may include registering an association between the user and the control panel for the automation system. The registration may also include contact information of the user, including one or more phone numbers, email addresses, and the like.

Example methods, systems, software, control panels, and the like may be used to remind (e.g., notify) a user to register for an enhanced service such as a remote access service. In one example embodiment, a method for prompting am automation system user to use an enhanced service may include determining that an enhanced service useful in connection with an automation system has not been used with the automation system. The method may further include sending a first message including information related to the enhanced service to a control panel specific to the automation system.

In another example embodiment, following activation or installation of an automation system, it may be determined whether or not a user has registered for an enhanced service. Determining whether or not the user has registered for an enhanced service may include determining that the user has not registered for the enhanced service, determining that the user has never used the enhanced service, and/or determining that the user has not used the enhanced service for a period of time. If the user has not registered, a message may be sent to the user to remind him or her to register for the enhanced service. Optionally a link (e.g., a hyperlink, bar code, quick response (QR) code, etc.) may be provided to direct the user to the enhanced service. The message may be sent directly to the control panel, or may be sent in other manners, such as, but not limited to, email or text messaging to a user device. In some embodiments, the control panel may determine whether registration has occurred, and may provide its own message to prompt the user to register for the enhanced service.

In some embodiments of the present disclosure, registration may be initiated or completed using the control panel of an automation system. When a user is prompted to register for the enhanced service, the user may also be asked to provide registration information. Example registration information may include a name, email address, phone number, and the like. In some embodiments, registration information may be used to provide additional information to a user. For instance, after providing a phone number or email address, a message may be sent to the user to provide a link, a hyperlink, bar code, QR code, or other way to access an online location where the enhanced service can be received or accessed. In other embodiments, an application dedicated to the enhanced service, or a link, bar code, QR code, or other similar element usable to access a download location for the application, may be sent to the user or potentially displayed on the control panel.

In some embodiments, a method for prompting a user to register or use an enhanced service available for a security or automation system may include, at a control panel of the security or automation system, receiving a first message including information related to the enhanced service available for use with the security or automation system. The method may further include displaying the first message on a display of the control panel, and requesting input from a user of the control panel in response to the first message. In one aspect, the first message may be received from a remote source. The first message may indicate that the user of the control panel has not yet registered for the enhanced service. In one aspect, the remote source may include one or more of a service provider, a web portal, or a network operations center.

In one aspect, displaying the first message may include displaying one or more input options for receiving input from the user. The one or more input options may further include one or more of a telephone number field, an email address field, an option to dismiss the first message, an option to obtain more information related to the enhanced service, or an option to register for the enhanced service directly through the control panel.

In some embodiments, requesting input from the user of the control panel may include requiring that the user provide the input in order to dismiss the first message.

In another embodiment, a control panel may include one or more processors, a display, and one or more non-transitory computer storage media having computer-executable instructions stored thereon that, when executed by the one or more processors, cause the control panel to receive a first message about an enhanced service available for use with the security or automation system. The computer-executable instructions may further cause the control panel to display the first message on a display of the control panel, and request input from a user of the control panel in response to the first message.

Other aspects, as well as the features and advantages of various aspects, of the present disclosure will become apparent to those of ordinary skill in the art through consideration of the ensuing description, the accompanying drawings and the appended claims.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

DETAILED DESCRIPTION

Systems, devices and methods of the present disclosure are configured for use in connection with residential and/or commercial buildings, or with other locations which may use an automation system. Without limiting the scope of the present disclosure, a home or business may have a security system installed to monitor use of the building, including entry into the building through a door, window, or other similar entry point. Sensors at the entry point may detect when the entry point is open or closed, and can respond in different ways in response to a change in status. For instance, when the security or automation system is armed, an alarm may sound if a door or window is opened. Optionally, police or security may be contacted to request they monitor the building. Of course, other types of components within the automation system may result in other responses. For instance, if a leak in a water pipe or sprinkler system is detected, a response may include shutting off a valve. If no one is detected in a particular location, lighting may be turned off or dimmed.

Figure 1:
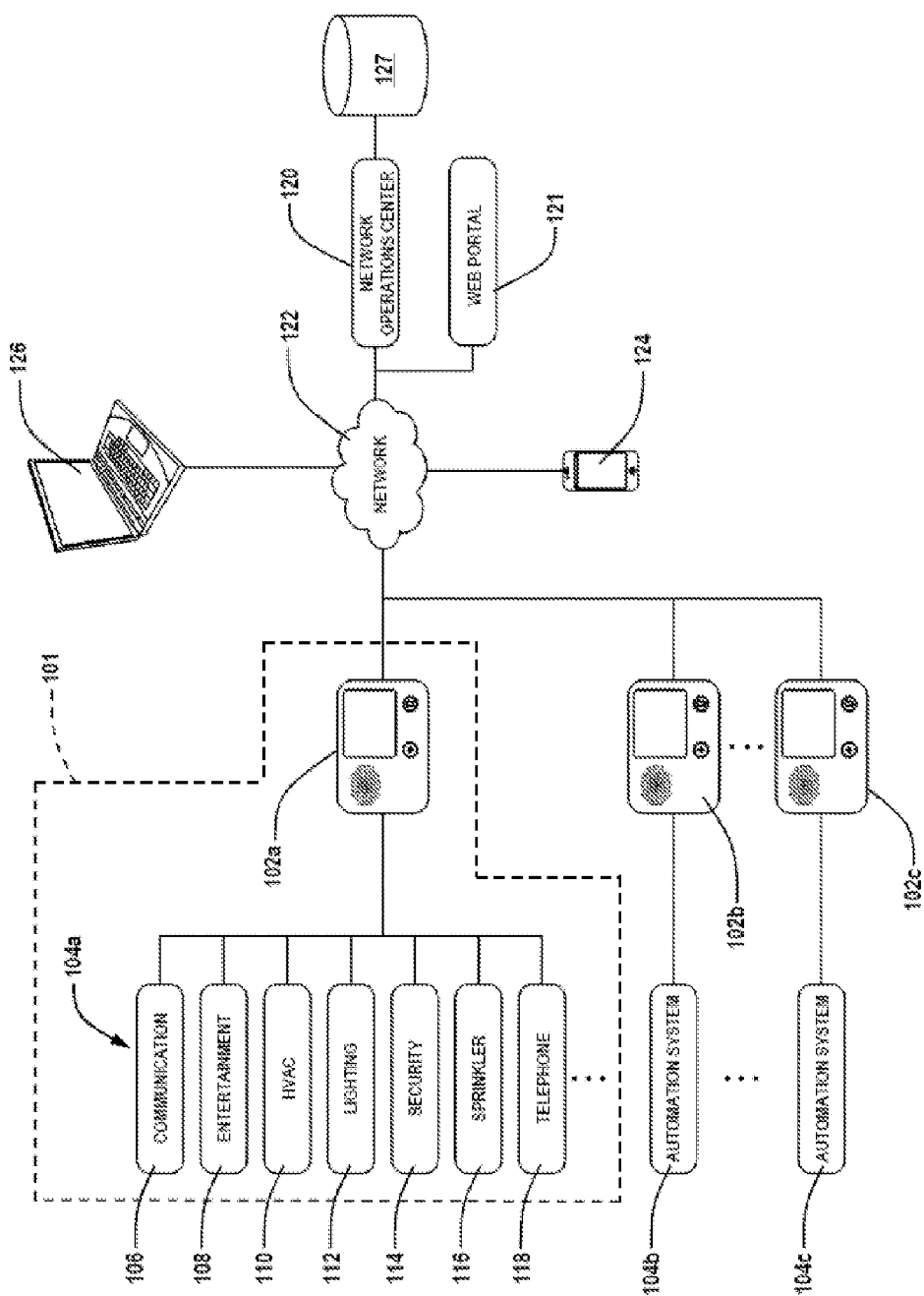
FIG. 1 is a schematic illustration of an example automation system according to one embodiment of the present disclosure.

Turning now to FIG. 1, an example distributed system 100 is illustrated for allowing control and/or monitoring of certain aspects of a physical location (e.g., a home, office, etc.). The illustrated distributed system 100 may generally represent, or include, an automation system associated with the particular location. As part of such a distributed system 100, a control panel 102a may be included. The control panel 102a may, but need not necessarily, be located at the location being monitored or controlled. For instance, in FIG. 1, the control panel 102 is located within a physical location 101 where an automation system 104a is also located. Certain aspects of the distributed system 100, or the automation system 104a, may be administered through the control panel 102a, or the control panel 102a may be used to provide users with information about a status of the automation system 104a.

The automation system 104a may generally be referred to herein as a "security system," but need not be limited to security-related features. Indeed, the automation system 104a of the illustrated embodiment may include a number of different components, any or all of which may be used in connection with the control panel 102a. In this particular embodiment, for instance, the automation system 104a includes a communications system 106, an entertainment system 108, a heating, ventilation, and air conditioning ("HVAC") system 110, a lighting system 112, a security system 114, a sprinkler system 116, and a telephone system 118.

Any or all of the systems 106-118 may include sensors, controllers, valves, switches, or other components, or any combination thereof. Such components may be controlled or set using the control panel 102a, may be monitored using other control panels 102, such as control panel 102b, 102c, may communicate with each other or the control panel 102a, or may have additional or other capabilities. Such components, which are generally used to monitor or control some aspect of a physical location associated with the control panel 102a, may generally be referred to herein as "automation components," and can each perform a variety of functions. For instance, a set of one or more automation components may be integrated as part of the security system 114 associated with the location 101. In some embodiments, the automation components of the security system 114 may include sensors that detect intruders (e.g., unauthorized opening of a door or window, motion sensors, etc.), sensors that detect smoke or fire, or some other security-related component or a combination thereof. In some embodiments, the security system 114 may include automation components such as cameras which obtain still or video images of one or more areas of location 101.

Automation components of the automation system 104a may take any number of forms, and are not limited to security components. For instance, automation components may include entertainment components such as televisions, recordable media players (e.g., DVD player, Blu-Ray Player, digital video recorders, VCR, set-top box, etc.), projectors, speakers, stereos, and the like, any or all of which may be separate from the control panel. Such entertainment components may be used, by way of example only, to turn on a television, radio, optical disk player, or the like, change a channel or volume of television or radio, or for other purposes. In the same or other embodiments, automation components may include thermostats, air conditioners, furnaces, temperature sensors, and the like, or controllers therefor. Monitored and/or controllable automation components may further include lighting system components such as light fixtures, switches, motion sensors, etc. to monitor the status of lights and/or to turn lights on or off. Additional components or controllers, or may include security system components including sensors or detectors (e.g., motion sensors, magnetic sensors, intrusion sensors, vibration sensors, infrared sensors, ultrasonic detectors, microwave detectors, contact sensors, photoelectric beam detectors, smoke detectors, temperature sensors, carbon monoxide detectors, etc.), video or still cameras, speakers, microphones, or other components. In embodiments where the automation system 104a includes a sprinkler system 116, the automation components may include valves, actuators, sensors (e.g., flow rate sensors, proximity sensors, etc.), sprinklers, pumps, and the like. In a similar manner, where one or more of the automation components is part of a telephone system 118, the automation components may include telephones, answering machines, call forwarding components, intercoms, and the like. Some or all of the automation components of the various systems 106-118 may also include wireless communication system components. As an example, the automation components may include routers, switches, access points, repeaters, bridges, and the like.

When a given condition occurs at a monitored automation component, the control panel 102a may be used to cause other automation components to respond. Additionally, or alternatively, the control panel 102a may communicate with components, including those remote from the physical location. As an example, upon monitoring the automation components of the systems 106-118, the control panel 102a can detect changes in status, which changes may correspond to events. For instance, as discussed herein, if the security system 114 includes an automation component, such as a sensor, at a door, the control panel 102a can detect when the door is opened. If the security system 114 is armed, opening of the door may correspond to an event indicating a potential intruder has entered the building. The control panel 102a may be programmed to respond accordingly. For instance, the security system 114 may also include an alarm automation component. The control panel 102a may turn on the alarm of the alarm automation component. Of course, the control panel 102a may also perform other actions, including initiating a phone call to the police or security (e.g., using the telephone system 118 or a radio component built into the control panel 102a. In the event of another type of event—whether detected using the security system 114 or another of the systems 106-118—the control panel 102a can facilitate initiation of other actions.

In at least some embodiments, the control panel 102a may communicate with one or more third parties. For instance, FIG. 1 illustrates the control panel 102a as being in communication with a network operations center ("NOC") 120. Optionally, the control panel 102a may provide the NOC 120 with information about detected events. In some cases, the NOC 120 may then take actions. By way of illustration, if the control panel 102a notifies the NOC 120 that a potential intruder has entered a building, the NOC 120 may respond by notifying police or security. Consequently, some actions taken in response to a detected event may be taken by the NOC 120 rather than by the control panel 102a.

FIG. 1 also illustrates an example embodiment in which the control panel 102a is in communication with a web portal 121. The web portal 121 may provide an online service which an owner, resident, or tenant of the location 101 may use to monitor and potentially control the automation system 104a. Optionally, the web portal 121 may also be used to receive notifications sent by the control panel 102*a*. The web portal 121 may also be used to take some actions (e.g., notifying a user of an event) instead of, or in addition to, the NOC 120 or the control panel 102*a*.

To allow the NOC 120 and/or web portal 121 to be aware of detected events, and to potentially respond to such events, the control panel 102*a* may communicate with the NOC 120 or web portal 121 through a communications network 122. The communications network 122, which may carry electronic communications, may include the Internet, local area networks, wide area networks, virtual private networks ("VPN"), telephone networks, other communication networks or channels, or any combination of the forgoing. Thus, it should be understood that the communications network 122 may operate in any number of different manners, and can include different components, and may be distributed so as to include different components at different locations. For instance, the communications network 122 may include a wireless communication system such as that provided by a mobile phone provider. As an example, the control panel 102*a* may include a radio component to communicate with or using the communications network 122 through GSM, CDMA, LTE, HSPA+ or other similar technologies used by mobile phone systems. In other embodiments, other wireless systems or even wired communication may be used. Any combination of the foregoing may also be used. Thus, while a single communications network 122 is illustrated, such a component may be illustrative of multiple devices or components. For instance, the communications network 122 may include multiple networks interconnected to facilitate communication.

Regardless of the particular type of protocols and systems used by the communications network 122, the NOC 120 or web portal 121 may receive information from the control panel 102*a* about events detected using automation components. In some embodiments, the NOC 120 includes human operators who monitor the events. Based on the type of event detected, the human operator may initiate some type of response. That response may be implemented using the control panel 102*a* by, for instance, sending information back to the control panel 102*a*, initiating voice communication through the control panel 102*a*, or in other manners. When implementing actions using the control panel 102*a*, the actions may be considered to be "in-band". In other embodiments, the human operator may initiate an "out-of-band" response. Such a response may include actions taken without use of the control panel 102*a*. For instance, after detecting an intruder, a phone call may be made to police or security to request that they monitor the location where the intruder was detected. A phone call could also be placed to the user or owner of the automation system 104*a*. As an example, the NOC 120 may be used to place a call to a telephone 124, send an email retrieved at the computing device 126, or otherwise initiate some communication or action.

While some responses may be taken or initiated by using a human operator, other responses may be automated. For instance, if a signal representative of a potential intruder alert is detected, the NOC 120 may automatically initiate an action, such as calling or otherwise communicating with the police, a home owner, or the like (e.g., text message, e-mail, emergency alert systems, etc.). Similar actions may be taken by the web portal 121. The NOC 120 may include computing devices to initiate such actions, and the web portal 121 may be managed by computing devices to similarly perform such actions. In accordance with at least one embodiment, the NOC 120 includes, or communicates with, a data store 127. The data store 127 may include information to allow automated components of the NOC 120 to determine what actions to take. Each event may, for instance, be associated with a different in-band and/or out-of-band action that can be taken, with such different actions being stored in the data store 127. As discussed in greater detail herein, the data store 127 may also store a description of dealer-specific procedures, including follow-up procedures, as part of a procedure description system.

The NOC 120 may optionally be used for other or additional purposes beyond responding to events detected by the automation system 104*a*. For instance, the NOC 120 may be a central monitoring location for use with multiple control panels 102*a*-102*c*. Indeed, the NOC 120 may be used to monitor any number of control panels 102*a*-102*c*, each of which may be connected to its own automation system 104*a*-104*c*. Further, the NOC 120 may update software or firmware on the control panels 102*a*-102*c*, for example, to ensure that the control panels 102*a*-102*c* are operating and communicating properly with automation components of their respective automation systems 104*a*-104*c* and/or with the NOC 120. As a result of such monitoring, when the automation components of an automation system 104*a*-104*c* detect a certain event (e.g., a security-related event such as a break-in, a fire, etc.), the control panel 102*a*-102*c* can obtain the information and optionally takes some prescribed action (e.g., initiating an alarm, performing a corrective action, notifying an administrator or user, etc.). The corresponding control panel 102*a*-102*c* may also communicate such information to the NOC 120 through the communication network 122 for review or action. In a similar manner, the web portal 121 may provide monitoring functionality for each of the control panels 102*a*-102*c*, as well as for their corresponding automation systems 104*a*-104*c*. The web portal 121 may communicate directly with the control panels 102*a*-102*c*, or may communicate with the NOC 120 (e.g., directly, or through the network 122) to offer advanced or enhanced services. Examples of enhanced services that may be offered through the web portal 121 to the location 101 may include control and monitoring options, including remote monitoring of the automation system 104*a*, remote starting or stopping of the various systems or components of the automation system 104*a* (e.g., arming/disarming the security system 114, turning on the sprinkler system 115, etc.), defining automation system profiles (e.g., a profile for how the HVAC system 110 or lighting system 112 operate), remote control of entertainment components (e.g., setting a video recorder or set-top box to record a program), remote answering of a telephone, or other options, or some combination thereof.

The distributed system 100 of the present disclosure may be implemented as a communication system in which the operations of various systems and components can be monitored through communication links. As discussed herein, such communication links may include wired or wireless links, or can include a combination of wired and wireless links, any or all of which may use different protocols or networks. Regardless of the particular mode of communication, the status or operation of devices and components can be reported to, or controlled using, the corresponding control panel 102*a*, network operations center 120, web portal 121, or even other electronic devices 124, 126. For instance, the electronic devices 124, 126 may interact with the web portal 121 to monitor and/or control aspects of the automation systems 104*a*-104*c*. The control panels 102*a*-102*c*, and the components of the automation systems 104*a*-

104c, may therefore include a number of different types of components that provide or receive electronic signals of one or more different types.

By way of example, the control panel 102a may be equipped to use one or more different communication protocols in communicating with automation components of the automation system 104a and with the communication network 122. Such communication protocols may be implemented using any combination of one or more of wired or wireless communication. As an example, automation components of the automation system 104a may operate using a wireless protocol, or system that allows a mesh network to be formed. Each automation component may, for instance, optionally be able to communicate with some or any other automation component, provided they are in range of each other. If the automation components use a wireless system for communicating with the control panel 102a, an automation component that is in range of the control panel 102a may also send information to, or receive information from, the control panel 102a. In some embodiments, the automation components may communicate with each other and the control panel 102a using the same communication protocol. Although not intended to limit the scope of the present disclosure, an example communication protocol for such an embodiment may be a low power, short range wireless communication protocol (e.g., Z-Wave, ZigBee, etc.). In other embodiments, larger range wireless communication protocols (e.g., WiFi, LightwaveRF, etc.) may be used in addition to, or instead of, the shorter range alternatives. Such connections may also allow two-way communication or may provide only one-way communication.

The control panel 102a may also optionally communicate with the communication network 122 and/or the NOC 120 or electronic devices 124, 126 using the same or other protocols. As an example, if the electronic device 124 is in sufficiently close physical proximity to the control panel 102a, a physical connection may be used, or a suitable wireless communication protocol (e.g., Z-Wave, ZigBee, Bluetooth, WiFi, etc.) may be used.

Communication with the communication network 122 may also be made in any suitable manner, including using wireless or wired communication, or a combination thereof. For instance, as discussed herein, an example control panel 102a may communicate with a network 122 operating on a mobile telephone system. A GSM, CDMA, LTE, HSPA+, or other similar wireless communication component may therefore be included in the control panel 102a and the network 122 to allow for such communication. In other embodiments, the network 122 may have other components to allow for alternative or additional types of communication between the network 122 and the control panel 102a. Moreover, a NOC 120 may communicate with different control panels 102a-102c of different automation systems 104a-104c using the same or different communication protocols, and potentially allow such control panels 102a-102c to communicate with each other.

Figure 2:
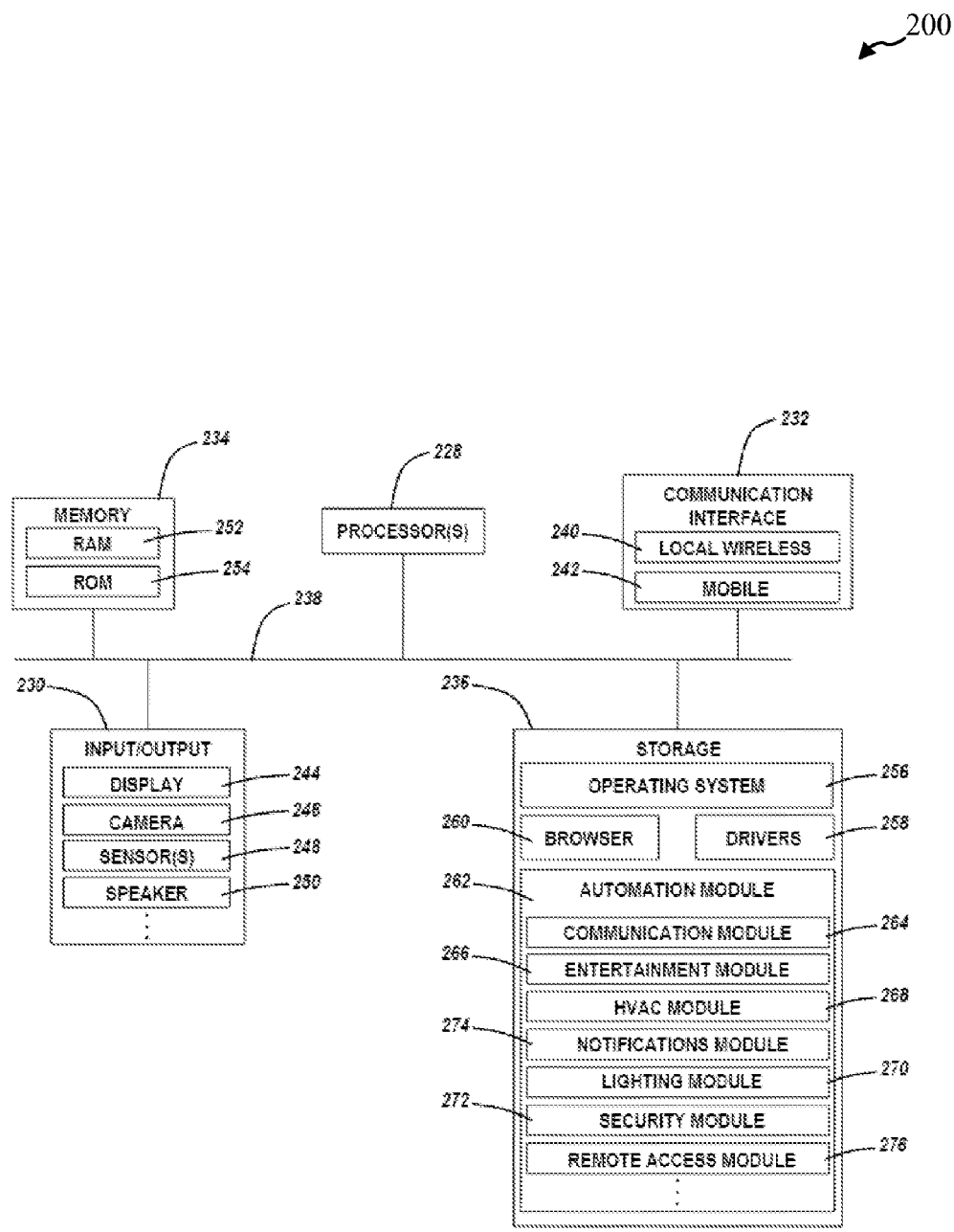
FIG. 2 is a schematic illustration of an example control panel usable in an automation system, according to one embodiment of the present disclosure.

Turning now to FIG. 2, an example control panel 200 is schematically illustrated. It should be appreciated in view of the disclosure herein that the control panel 200 may be used in the distributed system of FIG. 1 or in connection with any other system. Further, the illustrated control panel 200 is merely illustrative, and a control panel of the present disclosure may have fewer or additional components, or elements other than those expressly described or illustrated, or may be used in connection with systems or components other than those of FIG. 1 or the methods, systems, and devices disclosed herein.

In FIG. 2, the control panel 200 includes multiple components interacting together over one or more communication channels. In this embodiment, for instance, one or more processors 228 may communicate with input/output devices 230, a communication interface 232, memory 234 and/or a mass storage device 236 via a communication bus 238. The processors 228 may generally include one or more processing components, including a central processing unit, a graphics processing unit, or the like, any of which may be capable of executing computer-executable instructions received or stored by the control panel 200.

The processors 228 may communicate with the communication interface 232 using the communication bus 238. The communication interface 232 may receive or send communications via one or more networks (e.g., network 122 of FIG. 1) or otherwise communicate with other components or devices (e.g., automation system 104a of FIG. 1). Received communications may be provided over the communication bus 238 and processed by the processors 228.

In the particular embodiment illustrated in FIG. 2, the communication interface 232 may include multiple components to allow communication via one or more different protocols. For instance, the illustrated embodiment includes an interface component 240 for connecting to local components, such as over a wireless mesh network. As discussed herein, an example of the component 240 may include radio which operates using Z-Wave, ZigBee, or other protocols, or some combination thereof. Such a component may specifically be used to communicate with security or other automation system components. The automation system components, and thus the automation system in which the control panel 200 is used, may be associated with a home or residential building, an office or other building, or even for other spaces. Example automation components include, but are not limited to, one or more sensors, cameras, controllers, and the like.

In still another example embodiment, an example communication interface 232 may include an interface component 242 for communicating over a mobile telephone network. An example network may include, for instance, GSM, CDMA, LTE, HSPA+, or other communication typically used by a wireless carrier to communicate with a mobile device such as a telephone or tablet computing device. As discussed herein, in one example embodiment, the interface component 242 may be provided to facilitate communication between the control panel 200 and a network operations center (e.g., NOC 120 of FIG. 1).

In still another embodiment, the communication interface 232 may include other components. For instance, an example control panel 202 may be used to send and/or receive communications over a wireless protocol such as WiFi (i.e., IEEE 802.11), Bluetooth, or some other protocol. Moreover, according to some embodiments as disclosed herein, the wireless component 240 may be configured to allow the control panel 200 to function as a wireless access point.

According to some embodiments, the control panel 200 may include one or more input/output devices 230. In FIG. 2, the input/output devices 230 may communicate with one or more processors 228 using the communication bus 238. Any suitable type of input/output device may be provided. For instance, a control panel 200 may include buttons, keypads, voice recognition components, or the like through which input is received from a user. A display 244 may also be provided and used as an output to display information to a user. In some embodiments, the display 244 may also act as an input. For instance, the display 244 may be a touch-sensitive display allowing a user to touch the display 244 to make a selection, to provide input through a gesture, or to otherwise provide input. Still other types of input or output devices may include a camera 246, one or more sensors 248 (e.g., a microphone, infrared sensor, etc.), audio output devices such as a speaker 250, ports, or other elements or some combination thereof. The illustrated input/output devices 230 of a control panel 202 are merely illustrative. In other embodiments, for instance, trackball, mouse, biometric reader (e.g., iris scanner, fingerprint reader, etc.), GPS device, or other component, or some combination of the foregoing, may be included.

The control panel 200 may also include memory 234 and mass storage 236. In general, the memory 234 may include one or more of persistent and non-persistent storage, and in the illustrated embodiment the memory 234 is shown as including random access memory 252 and read only memory 254. Other types of memory or storage may also be included.

The mass storage 236 may generally be comprised of persistent storage in any of a number of different forms. Such forms may include a hard drive, flash-based storage, optical storage devices, magnetic storage devices, or other forms which are either permanently or removably coupled to the control panel 200. In some embodiments, an operating system 256 defining the general operating functions of the control panel 200, and which is executed by the processors 228 may be stored in the mass storage 236, although all or a portion of the operating system 256 may alternatively be stored in the memory 234. Other components stored in the mass storage 236 may include drivers 258 (e.g., to facilitate communication between the processors 228 and the input/output devices 230 and/or components of the communication interface 232), a browser 260 (e.g., to access or display information obtained over a network, including mark-up pages and information), and application modules.

Application modules may generally include any module, program, or application that may be used in the operation of the control panel 200. Examples of application modules may include programs specifically designed for use with a security and/or automation system (e.g., automation module 262), or more general use programs, applications, or modules. Examples of more general use applications can include word processing applications, spreadsheet applications, games, calendaring applications, weather forecast applications, sports scores applications, and other applications.

As shown in FIG. 2, in at least one embodiment, the automation module 262 may include, or operate in connection with, additional modules or components capable of being used by the control panel 200 in connection with a security or automation system. For instance, the automation module 262 may include an additional communication module 264. Such a communication module 264 may generally be used to control or monitor how one or more communication systems of a residence or commercial building operate. As an example, an intercom system may be provided at an entry to the building, and the communication module 264 may monitor its use and potentially be used in passing communications (e.g., using a speaker or sending communications to a remote device). The communication module 264 may similarly be configured to facilitate visual communications (e.g., using one or more cameras and/or visual display devices). Moreover, the communication module 264 may be used to determine when to allow or enable communication.

The illustrative automation module 262 is also shown as including an optional entertainment module 266, HVAC module 268, and lighting module 270. The entertainment module 266 may generally be used to monitor and/or control entertainment-related devices and functions of a location. For instance, the channel or volume of a television may be monitored and potentially changed using the control panel 200. The HVAC module 268 may generally be used to monitor or control heating or air conditioning components. For instance, if the temperature in a location is higher or lower than desired, the HVAC module 268 may control a thermostat to obtain a more comfortable temperature. Similarly, the lighting module 270 may monitor, control or otherwise interface with lighting components including switches, lighting fixtures, and the like. In some embodiments, such as where a light is provided at an entry way, the lighting module 270 may interface with sensors used to detect the presence of a person (e.g., a motion sensing light). The lighting module 268 may also be used to perform other functions (e.g., automatically turn on a light in response to a trigger event).

The modules 272-276 may provide additional, and potentially similar functions. For instance, the security module 272 may be used to interface with security-based automation components, such as sensors (e.g., motion sensors, magnetic sensors, intrusion sensors, vibration sensors, infrared sensors, ultrasonic detectors, microwave detectors, contact sensors, photoelectric beam detectors, smoke detectors, temperature sensors, carbon monoxide detectors, etc.). When an event is detected, the security module 272 may determine how the control panel 202 should respond to the event, what communications to send to a NOC, or what other actions to take.

The notifications module 274 may have other functions. For instance, in response to some events, it may be desirable to provide information to a remote or other third party. As an example, a NOC. such as NOC 120 of FIG. 1, may be sent information about an event to allow the NOC to respond to the event. In some embodiments, the notifications module 274 may therefore collect information from one or more other modules 264-272 and prepare a report on events, the status of automation components, or the like. Such a report may be prepared periodically or in response to a particular event. In one embodiment, an event may trigger a report by the notifications module 274, which can then use the communication interface 232 to send the report to a NOC or other location.

The notifications module 274 may also be used for other functions. As discussed herein, a control panel 200 may also receive information from one or more sources. Such sources may include automation system components, and the notifications module 274 may collect, store, and potentially report on received information. The notifications module 274 may also receive information from a NOC or other similar location or service provider. As an example, a NOC may send information requesting that the control panel 200 take a particular action (e.g., turn on an alarm). The notifications module 274 may receive the information and then distribute the information to an appropriate module (e.g., security module 272) or automation component. In still another embodiment, information that is received may be displayed or otherwise output using the input/output devices 230.

It accordance with at least some embodiments of the present disclosure, the notifications module 274 may display or otherwise provide information to a user of the control panel, which information can relate to enhanced features associated with an automation system. For instance, as discussed herein, an automation system may be associated with a web portal, mobile application, or other service that allows remote control and/or monitoring of the automation system. Information provided through such components may be provided to the control panel 200 and displayed on the display 244 using the notifications module 274.

In other embodiments, a NOC or other system or component may provide still other information related to such enhanced services. For instance, a user may register for an online, remote monitoring service. The registration may be associated with a particular automation system that is to be monitored or controlled using remote devices (e.g., a smart phone, a computer, etc.). If the user forgets a password associated with the registration, the user may initiate a password recovery process to be reminded of the password or to get a new password. That information may be sent to a remote device or service (e.g., an email service, a text message to a smart phone, etc.), but may also or alternatively be sent to the control panel 200, and displayed using the notifications module 274. In still another embodiment, the NOC or other component may track usage of enhanced services such as remote monitoring. If the user does not register for enhanced services, or does not often use the enhanced services, the NOC or other component may initiate a reminder message. That reminder message may be sent to the control panel 200 and output using the notifications module 274. An example message may say something to the effect of: "You have not registered your system for remote, online access. Go to http://www.samplehyperlink.com/register to activate your system." Of course, other messages relating to enhanced services may also be provided. For instance, rather than displaying a hyperlink, a bar code, QR code, or other similar element (optionally at the option of the user) may be displayed to activate the system. In other embodiments, messages may include information about new enhanced services that become available, reminders to users that enhanced services are available (e.g., where not used for an extended period of time), messages about enhanced services rarely or never used by the user, and the like. Messages related to new or unused enhanced services may also include links, bar codes, QR codes, and the like to activate a service or obtain more information about a service.

The foregoing description and the modules shown in FIG. 2 are purely provided to illustrate the variety of different types of modules, programs, or applications that may be included, and are not intended to be an exclusive list. In other embodiments, for instance, additional modules may include a remote access module 276. Such a module could, for instance, enable the control panel 200 to be directly accessed using remote devices (e.g., devices 124, 126 of FIG. 1), and to potentially have communications relayed through the control panel 200 either to or from the remote devices. In other embodiments, however, remote access may be enabled through a web portal, NOC, or other device, and managed by the remote access module 276. The remote access module 276 may communicate with other modules 262-274. Thus, a user of a remote device could potentially set or view communications, door cameras, entertainment, lighting, security, HVAC, sprinkler, telephone, or other settings remotely, or even receive or otherwise monitor audio or video feeds from a remote location.

The automation module 262 may also include additional or other modules or components, including modules not shown in FIG. 2. For instance, the automation module 262 may include a sprinkler system module (e.g., to verify water flow rates at one or more locations, turn sprinklers on or off, etc.), a telephone module (e.g., to interface with a telephone system and potentially run telephone calls through the control panel, to forward calls, etc.), an updating module (e.g., to pull or request software updates), and the like. In other embodiments, modules may be included and which relate to authentication, settings, preferences, an emergency override, or other modules.

Figure 3:
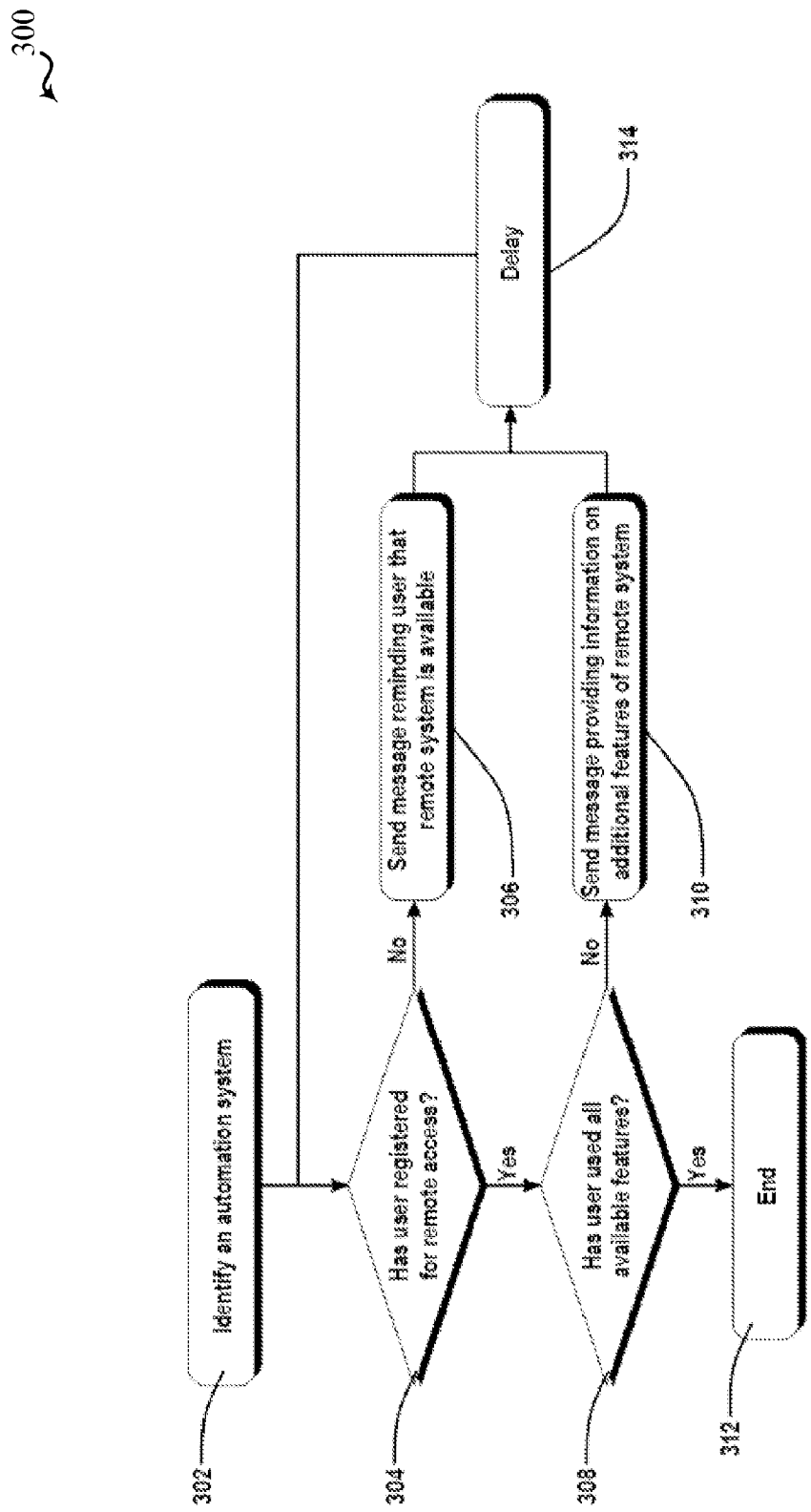
FIG. 3 illustrates an example method for prompting a user to register or use a remote access service associated with an automation system, according to one embodiment of the present disclosure.

Turning now to FIG. 3, an example method 300 is illustrated for using an automation system to follow-up with users who have access to enhanced features of the system. In one example, an automation system may be purchased. Upon setting-up the automation system, the user may access or otherwise set-up enhanced features. An example enhanced feature may include a remote access service. To use the remote access service, an owner of the system may first register for the service by, for instance, visiting a website, downloading a mobile application, or the like. To register, the user may set-up an account by providing login credentials (e.g., user name, password, etc.), providing personal information (e.g., phone number, email address, address, etc.), associating the account with a particular control panel or automation system, or by providing any other information, or some combination of the foregoing.

Once the account is created, computing devices other than the control panel may potentially be used to monitor or interact with the automation system. For instance, if an event is detected, the control panel may send an alert to a NOC, such as NOC 120 of FIG. 1, and the NOC may use the remote access service to notify the user of the event (e.g., by sending an email, sending a text message, making a phone call, etc.). Additionally, or alternatively, the user may use a device other than the control panel (e.g., a computing device, a smart phone, etc.) to potentially monitor components of the automation system. Remote access may allow a number of functions to be done regardless of whether the user is near the control panel. A user may, for instance, change the status of automation components (e.g., arm/disarm a security system, record a program using a set-top box, turn on a sprinkler system, etc.), create profiles for automation system components (e.g., a vacation profile to reduce energy costs or turn on lights to make it appear someone is home), view billing information, make changes to services provided through the automation system, or perform other actions, or some combination of the foregoing. Some or all of the same options may, but need not necessarily, be available directly through a control panel. The remote access service may therefore allow the user to manage any or all components of an automation system regardless of the user's actual physical location.

Some users of the automation system may, however, not initially register for the remote access service. A user may determine that he or she would be unlikely to use the system, and thus never register for the service. Another user may decide to wait to register for the service, but may then forget that the service is available or forget how to register. In either case, such a user could at a later time want to register if reminded that the service is available.

The method 300 of FIG. 3 illustrates an example method in which a reminder or follow-up message may be provided to users to allow them to register for an online or remote access service, even if they do not register when the automation system is initially set-up. The method 300 may be performed by a NOC, a web portal, a service provider, or some other entity, or any combination of the foregoing. Regardless of who performs the method 300, acts of the method 300 are optionally repeated at regular intervals (e.g., every thirty days, every six months, every year, etc.), or at irregular or other intervals to potentially follow-up multiple times to remind a user to sign-up for the remote access service.

Now specifically referring to FIG. 3, the method includes an act 302 in which an automation system is identified. A data store may provide a list of control panels or automation systems that have been installed or otherwise set-up. The same or another data store may also contain information about customers who have purchased automation systems. Optionally, a particular control panel or automation system is cross-referenced with a customer so that identification of an automation system may be performed by either identifying a customer or by directly identifying an automation system component, such as a control panel.

When an automation system is identified in act 302, the method may further determine whether a user associated with the automation system has registered for remote access (act 304). This may include reviewing registration information for a web portal or other remote access service to determine if a customer has completed a registration process. A look-up may be used by identifying the customer, the control panel, an automation system component, or in any other suitable manner.

If it is determined that the user has not registered for the remote access service, a message may be sent to the user, to remind the user that the remote access service is available (act 306). Sending the message may be performed in any number of manners. For instance, if the user's phone number or email address is known, an email or text message may be sent. In another embodiment, an application may operate on a smart phone, and a message may be sent as an alert through the application (e.g., an alert indicating that a particular mobile application is available from a service provider, store, or other location in order to provide the remote access service). In other cases, a message may be sent directly to the control panel. As an example, a provider of the remote access service may send a message to the control panel as a follow-up to remind the user that a remote access service is available, and potentially how to register for the service. In some embodiments, the message may also be created by the control panel, rather than sent thereto. For instance, the control panel may be notified when registration occurs and, if registration does not occur within a particular period of time, the control panel itself may provide a message reminding the user to register for remote access. Of course, the control panel could also query a remote access server from time-to-time to see if registration has occurred.

When it is determined in act 304 that the user has already registered for a remote access service, the method 300 may end (act 312) without a message being sent or provided to the user. In other embodiments, however, additional messages may be sent. For instance, although a user has registered for a remote access service, there may be multiple service options available. A determination can be made in act 308 to determine if a user has registered for, or used, all of the available features of the remote access service. If the user has not, a message may be sent in act 310 to provide a reminder or other information to the user about the additional features.

Such a feature may be used where, for example, a user uses some services, but not others, or where new services are available. For instance, a user may register for remote access and use the remote access service merely to make online payments for servicing the automation system. The user may not use, and may be unaware, that the same system can potentially be used to remotely check whether lights are on or off, turn lights on or off, water the lawn, arm or disarm a security system, or the like. A remote access service may track what services are used, and if the user is not making use of some service options, the message sent or provided in act 310 may give the user information about what enhancements are available but so far have not been used. Of course, if the user is making full use of the remote access service, no message may potentially be sent, and the method 300 can end in act 312.

As noted previously, the method 300 may be run a single time, or may be run multiple times. For instance, a message may be sent in act 306 or 310 to a user. The user may not register for a service immediately, and may then again forget to register for the service. A user may not wish to be reminded repeatedly of the availability of other options. As a result, the method 300 may include an act 314 where a delay is introduced. The delay in act 314 may allow the method 300 to be repeated, but only after a period of time has expired. That period of time may be fixed or may be variable. For instance, the delay in act 314 may be a predetermined time period (e.g., a week, a month, three months, etc.). In other embodiments, the delay in act 314 may be variable. In at least one embodiment, the delay in act 314 may be based in whole or in part on the availability of new services. Each time a new service or feature of the remote access service is available, the method 300 could be repeated to inform customers of the available service.

Figure 4A:
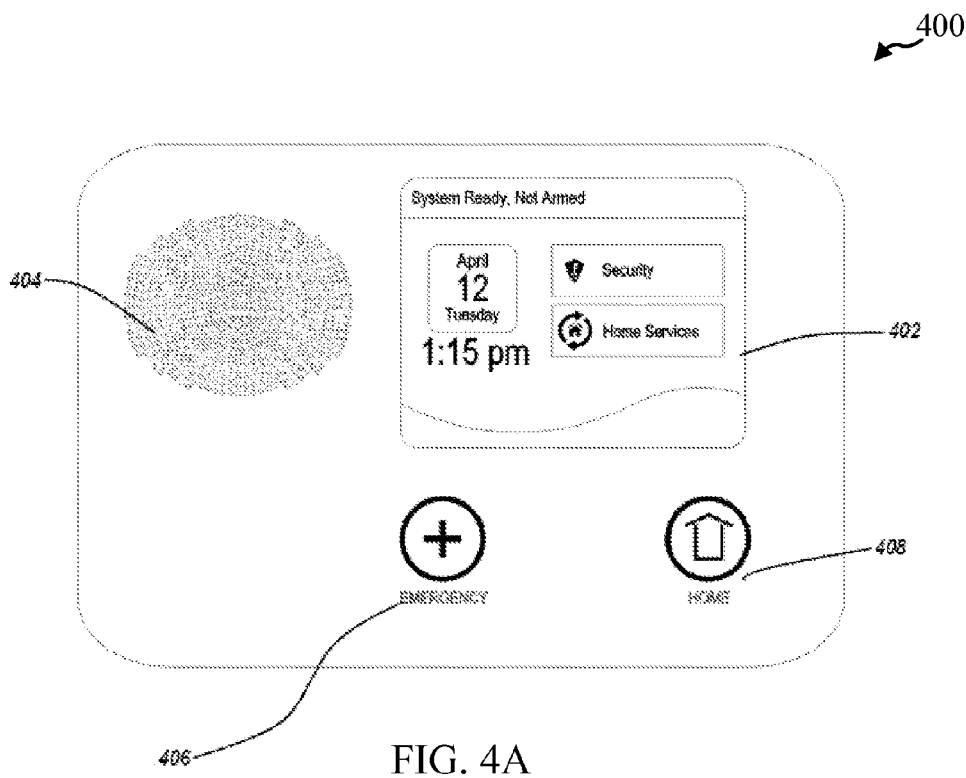
FIG. 4A illustrates an example control panel usable in the method of FIG. 3, according to one embodiment of the present disclosure.
Figure 4B:
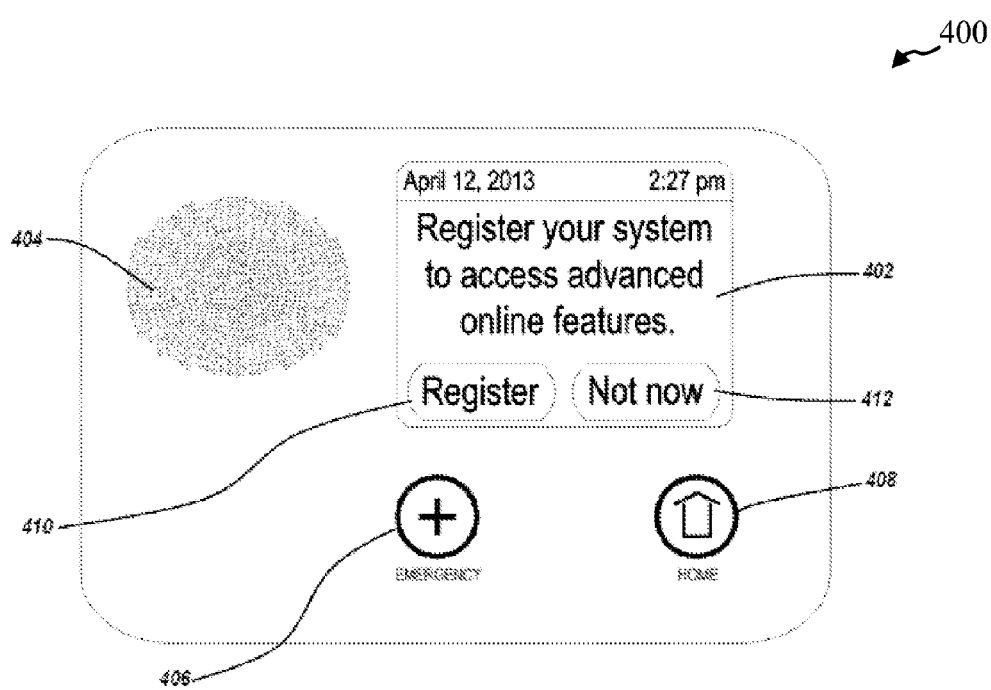
FIG. 4B illustrates the example control panel of FIG. 4A displaying a message prompting a user to register for an enhanced service, according to one embodiment of the present disclosure.

To provide a more complete understanding of some embodiments in which aspects of the present disclosure may be used, reference is now made to FIGS. 4A and 4B, which illustrate an example control panel 400. The illustrated control panel 400 may generally represent an example of a control panel that may be used in connection with systems, methods, and devices of the present disclosure. In some embodiments, the control panel 400 may therefore be used in a method for providing follow-up to a user and remind the user of the availability of enhanced services. The control panel 400 of FIGS. 4A and 4B may, for instance, be used to perform all or some of the acts of the method 300, or may receive information provided through the method 300 (e.g., a message sent to the user as a follow-up reminder of the remote access service, or a feature thereof). Control panel 400 may also include one or more aspects of control panel 200 described above in reference to FIG. 2.

In FIGS. 4A and 4B, the control panel 400 is shown as including a display 402, speaker 404, and input devices 406, 408. The display 402 may provide text, images, video, and other information that may be visually depicted to the customer. The speaker 404 may provide information to be audibly conveyed to the customer. Examples of such information may include alarms or alerts; however, other information may also be provided. For instance, the control panel 400 may be used to receive audible messages from a NOC or other service center, or from an emergency responder, and potentially to engage in two-way communication. Thus, the speaker 404 may also include a microphone to receive audio information from the customer and pass it to a representative at a service center, a caller on a phone line, a person in another room through an intercom, or the like.

The illustrated input devices 406, 408 generally represent any of various other types of inputs that may be used to interact with the control panel 400. Input device 406 may, for instance, be a button used to initiate an emergency call. Such a call may be placed to a response center for the dealer of the control panel, or to a local police, security, fire department, or other emergency response location. The input device 408 is illustrated as a "home" button. In some embodiments, the display 402 may include different interfaces or screens, and the input device 408 may be used to return to a so-called home or initial screen. In other embodiments, other types of input/output devices may also be provided. Examples of other input devices may include keypads, sensors, and ports. In some embodiments, the display 402 may also act as an input device, such as where the display 402 is touch-sensitive.

As discussed herein, the control panel 400 may interface with, or be part of, an automation system that includes one or more automation components. Examples of different types of automaton components are described herein, and can include security components, lighting components, HVAC components, and the like. Optionally, the control panel 400 monitors such automation components and detects events that occur. The control panel 400 may be able to monitor and potentially change the status of such automation components. Thus, the control panel 400 may be able to change the status of security components to arm or disarm a security system, or to turn an alarm on or off. Similarly, the control panel 400 may be able to detect what lights are on and potentially turn lights on or off. The control panel 400 may similarly interface with automation components of an entertainment system, sprinkler system, HVAC system, communication system, and the like.

The control panel 400 may also be connected to a communication network, including in any manner discussed herein. Such may allow the control panel 400 to connect to a NOC or to a service provided by another entity. An example service provided by a NOC or third party may include a remote access service whereby some or all aspects of the automation system monitored by the control panel 400 may be remotely controlled or monitored. In accordance with embodiments disclosed herein, a user may be required to register for all or portions of the remote access service. If the user does not register within a period of time, the user may be reminded that registration for the remote access service is available or required.

FIG. 4B illustrates an example of a follow-up message, or reminder, that may be provided to a user using the control panel 400. In this particular embodiment, the control panel 400 may generate or receive a message that is then displayed on the display 402, although a similar message may be provided audibly over the speaker 404. In this particular embodiment, the message provides a notification that online (or remote) features may be available and that the user should register to access the advanced, online features.

FIG. 4B provides but one example of a suitable follow-up message reminding a user to register for a remote access service, or some other enhanced feature. Another message may provide additional information, including a link to a registration portal, instructions on how to register or use a service, or the like. In FIG. 4B, the display 402 of the control panel 400 may also provide additional input options. An example input option 410 may be provided to begin the registration process. Upon selecting the input option 410, the control panel 400 may, for instance, initiate communication with the remote access service provider, and allow the user to register using the control panel 400 directly. Alternatively, the input option 410 may be used to provide other information, including instructions on how to register. The input option 410 may also initiate communication with another device of the user. Upon selecting the input option 410, the control panel 400 may send an email or text message to the user with other instructions and information, or may communicate with a remote service (e.g., a NOC, a web portal, etc.) which can initiate the communication.

Figure 4C:
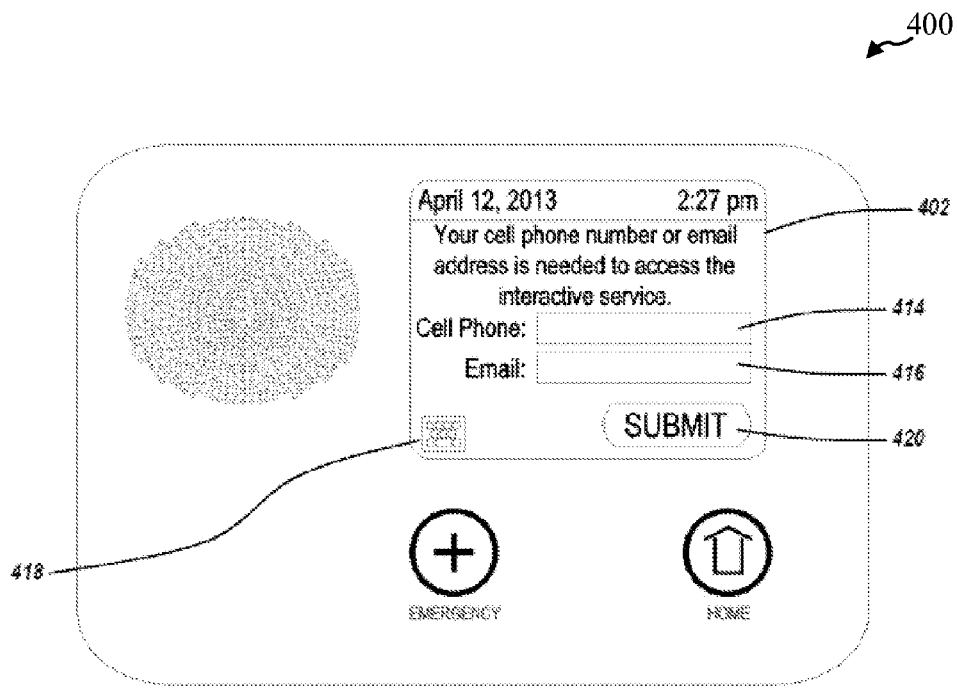
FIG. 4C illustrates the example control panel of FIGS. 4A and 4B displaying a request for a user's contact information to register for an enhanced service, according to one embodiment of the present disclosure.
Figure 4D:
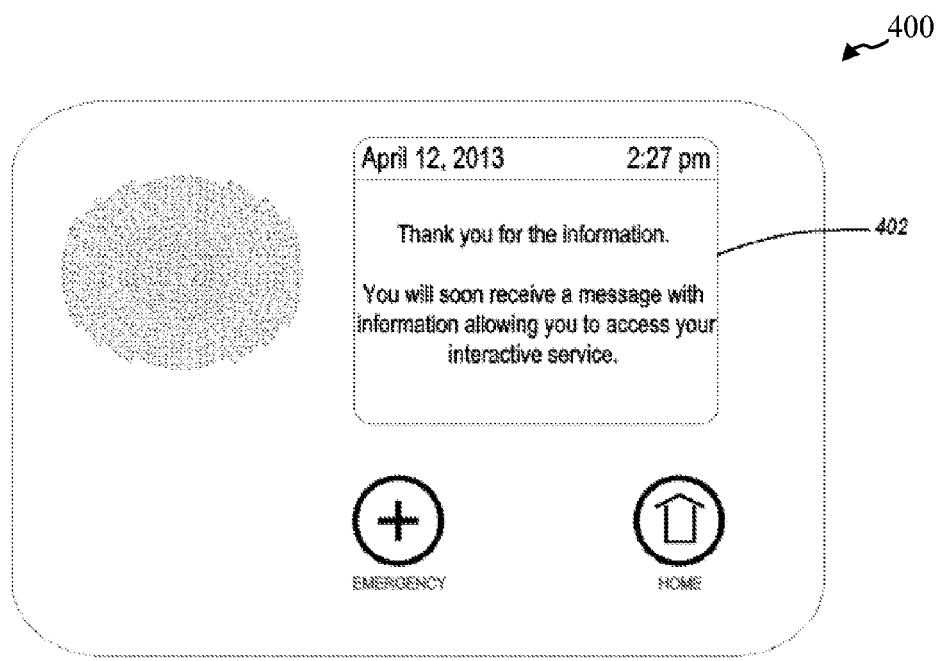
FIG. 4D illustrated the example control panel of FIGS. 4A-4C, displaying a confirmation message after a user has entered requested information, according to one embodiment of the present disclosure.

If the user is not interested in registering or obtaining information about the service, the user may select the input option 412. In this embodiment, the input option 412 may dismiss the message on the display 402. The input option 412 may alternatively, or additionally, be used to allow a user to opt-out of future follow-up reminders about the same or different services. In other embodiments, however, a user may not be given an option to avoid registration or to opt-out from future reminders. For instance, FIGS. 4C and 4D illustrate another example embodiment of the control panel 400. In this embodiment, the control panel 400 may again generate or receive a message displayed on the display 402. The message shown in FIG. 4C includes a prompt for a user to register for an interactive service, which service may include a remote access service, online monitoring service, or other similar service. In this particular embodiment, the user is notified that registration is needed, and that a cell phone or email address is needed to access or register the service. One or more input fields (e.g., input fields 414, 416) may be provided to allow a user to then input the requested information. Information may be input in any suitable manner. For instance, a keypad or other input device that is included as part of the control panel 400 may be used. In this embodiment, a keypad may be a virtual keypad displayed on the display 402. A keypad display option 418 may be displayed on the display 402 and, when selected, a keypad may fill a portion of the display 402. Once the user has input the desired information using the keypad, the user can select a submit option 420.

Selection of the submit option 420 may trigger sending of the information to a remote location, such as a provider of the remote access service. In some embodiments, the provided information may complete registration, and a user may then have access to the remote access service. In other embodiments, the information provided by the user may be used to provide the user with information needed to complete registration, or to use the remote access service. As shown in FIG. 4D, for instance, upon submitting the information requested in FIG. 4C, a user may be notified that additional information will follow to provide access to the remote access service.

Figure 5:
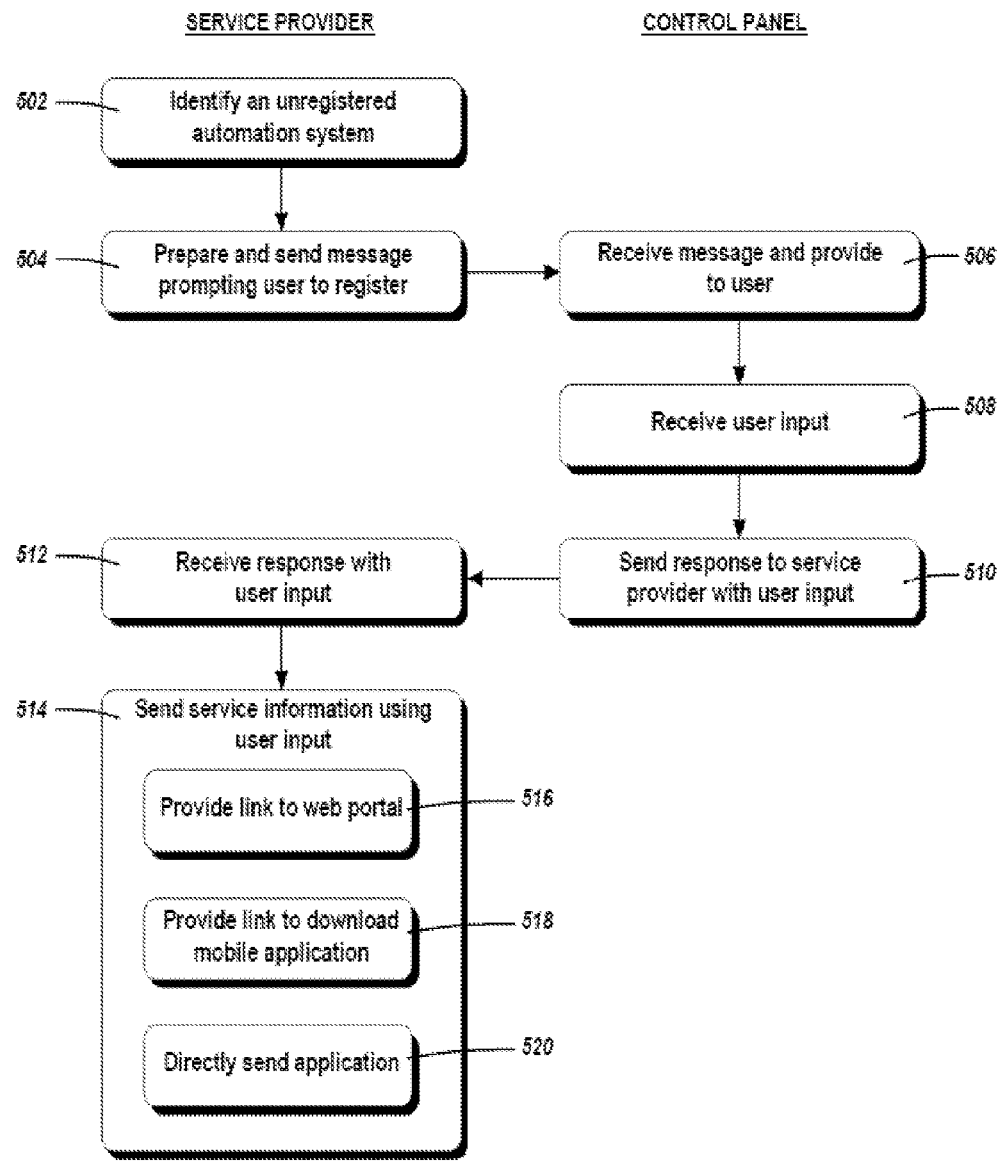
FIG. 5 illustrates an example method for prompting a user to register for an enhanced service for an automation system, and to request user input usable to send a message providing access to the enhanced service, according to one embodiment of the present disclosure.

FIG. 5 illustrates an example method 500 in which information may be provided by the user to facilitate completion of registration and/or use of an interactive service. The method 500 of FIG. 5 may be used in connection with the method 300 of FIG. 3, or in connection with other embodiments disclosed herein. Indeed, one skilled in the art should appreciate, in view of the disclosure herein, that certain acts of the method 500 may be the same as, or interchangeable with, those of other methods disclosed herein. Thus, unless a method, or an act or step thereof, is described as being incompatible with other methods, acts, or steps, the various components of each method herein may be interchanged or used in combination.

In FIG. 5, the method 500 may include various acts or steps performed by different entities or components. In this particular embodiment, the method 500 includes acts performed by a service provider (e.g., a provider of an online service, a remote access service, an interactive service, etc.) and acts performed by or at a control panel. The method 500 may therefore be separated into multiple methods, including a method performed by the service provider and a method performed by the control panel. In other embodiments the method 500 may include acts or steps performed by different components, or may be performed completely by a single component or system.

In this particular embodiment, the method 500 may include identifying an unregistered automation system (act 502). The unregistered automation system may be identified by determining that a control panel of a user is not associated with an interactive service, such as a remote access service. Once such a control panel and/or automation system is identified, the service provider may prepare and send a message prompting the user to register (act 504). The message may take any form. In FIG. 4C, for instance, the message may include a request for personal information, while in FIG. 4B the message may include a reminder about a service and an option to register or opt out of registration.

The message sent in act 504 may be received by the control panel in act 506. As part of receiving the message, the message may also be displayed or otherwise provided to the user. In a particular embodiment in which the message requests some input from the user, user input may be received in act 508 in response to receipt and display of the message in act 506. For instance, input may include a user's selection of a registration option (see FIG. 4B) and/or the provision of contact information (FIG. 4C). If the response includes user input (e.g., contact information), the control panel may optionally send a response back to the service provider, which response can include some or all of the input provided by the user (act 510). The service provider may then receive the response in act 512. Optionally, the response sent back to the service provider may also allow the service provider to identify the control panel. Upon receipt of the response, the service provider may then start or complete registration of the user, and associate the user's contact information with a particular control panel. In other embodiments, the particular control panel may be identified with a particular user prior to receipt of the response in act 512.

Any type of user input may be requested or provided. Optionally, the user input includes contact information that may be suitable for use in sending a message directly to the user. For instance, an email address may be used for generating an email with registration information. A cell phone number may be used to generate a text message. Of course, other messaging options may also be provided.

Regardless of the particular type of contact information, the contact information may then be used to send registration information to the user (act 514). In one embodiment, for instance, a text message, email message, or other message may be sent with a link (e.g., hyperlink, bar code, QR code, etc.) to a web portal (act 516) or other location. In the event that the provided contact information was sufficient for registration to be complete, the link may be provided to enable the user to begin using the interactive or remote access services. In another embodiment, the link may be provided to download an application, including a mobile application (act 518). For instance, the control panel, or a web portal or other service provider, may have a stored link (e.g., hyperlink, bar code, QR code, etc.) that can direct the user to a download location for an application. Such an application may be used on a mobile device such as a smart phone, tablet computing device, or the like. The link can allow the user to directly access and potentially download the application (whether through the provider, an online store, or other location). The application that is provided may then be used with registration information, such as the mobile phone number and/or email address of the user. In an alternative embodiment, a message may be sent in act 520, and can directly include the application, which is potentially a mobile application, in lieu of a link to the application.

In some embodiments, downloading an application may include activating the application. For instance, when setting-up the application, the user may be required to enter an activation code to ensure the application is associated with the proper control panel and/or is used only by an authorized customer. The activation code may be provided with a link displayed on a control panel, email, text message or the like. In some embodiments, the activation code may be available directly from the control panel. In such an embodiment, an alphanumeric code, bar code, QR code, or the like may be stored on the panel. A web portal, NOC, or other system may also periodically update the authentication code (e.g., by pushing an updated authentication link or code), or update a code or link stored on the control panel in order to access the location where the application can be downloaded (e.g., by also pushing an updated link or code). In other embodiments, an activation code may be provided to the user by the service provider. For instance, the web portal (or a NOC or other service provider) could generate a code. The code can be provided to the user for entry to authenticate and enable the application. The code itself may be in a number of forms, including alphanumeric, or as a QR code, bar code, or the like. Where a QR code, bar code, etc., the image may be downloaded or scanned using the device on which the application is used. In some embodiments, the generated code may be temporary. For instance, the web portal or other service provider may generate the code and have it set to expire after a predetermined period of time.

It should be appreciated in view of the disclosure herein that the method 500 of FIG. 5 may also be repeated in full or in part, in some embodiments. For instance, if the service provider determines that a phone number or email address is incorrect, the method 500 may be repeated to request additional information from the user. The method 500 may continue to be repeated until valid information is obtained. Optionally, even if valid information is obtained, the method 500 may be repeated where, for instance, a user is sent a link or an application, but fails to access or use the corresponding service. The method 500 may then provide the same information, or a reminder about how to access the service.

While embodiments disclosed above relate primarily to methods and systems in which a user of an automation system is prompted to register for enhanced features, such as an interactive service or remote access service, embodiments of the present disclosure may also be used in other manners. For instance, as noted herein, if a new feature is provided for an existing service, information on that new feature may be provided to the user in accordance with methods disclosed herein. Similarly, if it is determined that a user is not taking full advantage of a service, or a portion thereof, messages may be provided as discussed herein.

Figure 6:
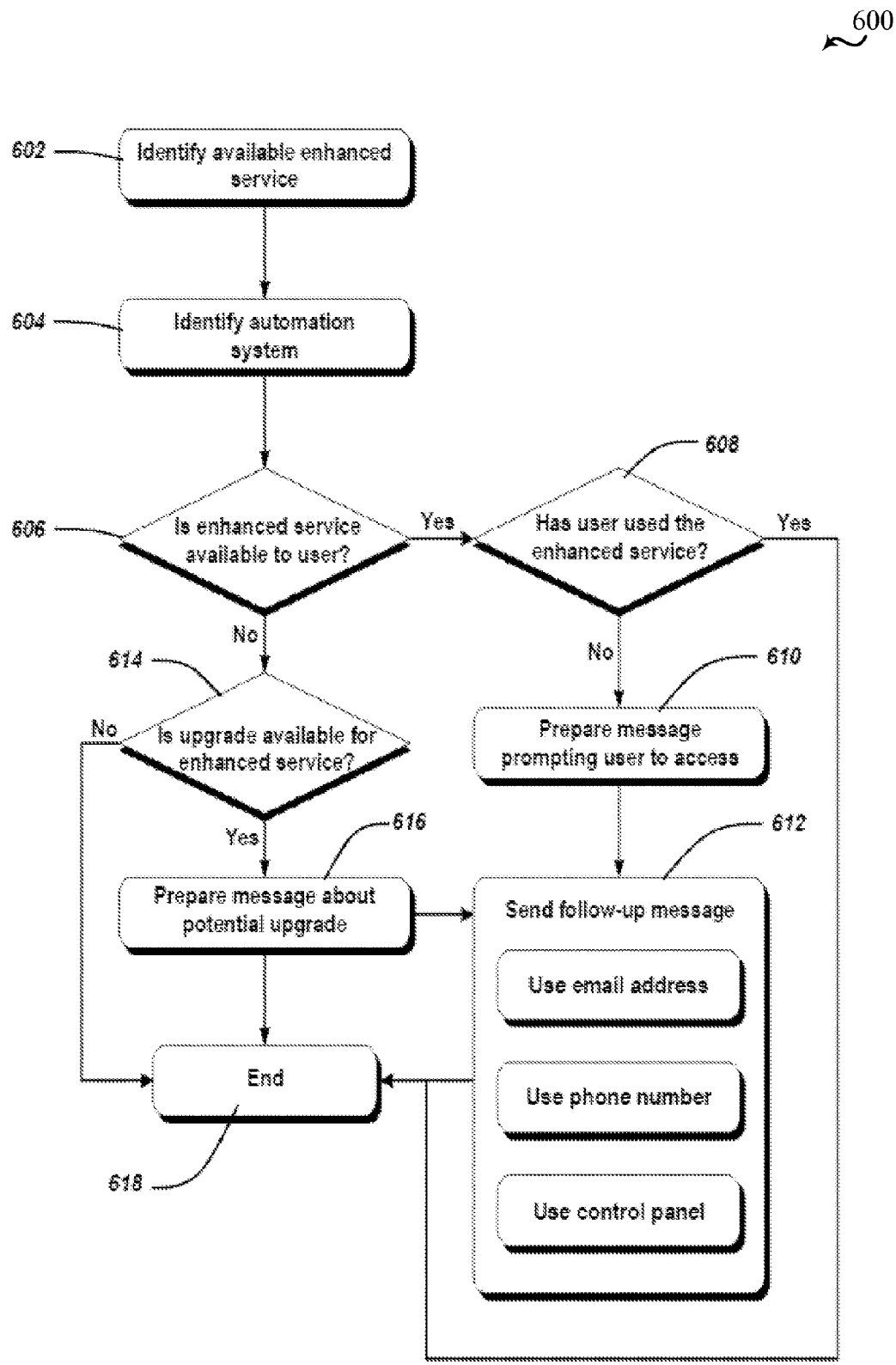
FIG. 6 illustrates another example method for sending a message to remind a user about an enhanced service for an automation system, and potential upgrades for such an automation system, according to one embodiment of the present disclosure.

FIG. 6 illustrates yet another method 600 for prompting users to access and use enhanced services associated with an automation system. The method 600 may include some acts or steps similar to those of method 300 of FIG. 3 and/or method 500 of FIG. 5. The acts and steps of method 600 are therefore intended to provide additional and alternative options for methods in accordance with embodiments of the present disclosure, and are not intended to be limited to only the method of FIG. 6, nor to exclude other suitable acts or steps as described herein.

In the method 600, one or more enhanced service are identified in act 602, which enhanced services may be available to automation system users. As discussed herein, the enhanced services may include an online, interactive, or remote access service, or any component thereof. Enhanced services may, however, include additional features as well. For instance, a control panel may itself include features that are enhancements on a traditional automation system. As an example, the control panel may include an antenna to act as a wireless access point. In such an embodiment, that feature may be identified, particularly if not used by the user.

An automation system may also be identified (act 604) in any suitable manner. The particular manner in which the automation system and enhanced service are identified may be varied, particularly inasmuch as the method 600 may be performed by any of one or more different systems, subsystems, or components. Thus, a control panel may itself identify an automation system and enhanced service in one manner, whereas a NOC or web portal may identify automation systems or enhanced services in other manners.

Regardless of the particular manner in which an automation system and/or enhanced service is identified, the method 600 may include making a determination as to whether the enhanced service is available to the user of the automation system (act 606). In some embodiments, certain enhanced features may not be available to all automation systems. By way illustration, if a control panel does not include a WIFI antenna, it may not be available as a wireless access point. Similarly, if the automation system does not include sensors connected to an entertainment system, enhanced entertainment-related functionality may not be available. In other embodiments, an enhanced service may be available to only some subscription or service plans, and users with other plans may not have access to such services.

If it is determined in act 606 that the user does have access to an enhanced service, an additional determination may be made in act 608 to determine if the user has used, or registered for, the enhanced service. In the event that the user has not registered or used the service, or even if the user has not used the service for an extended period of time, a message may be prepared prompting the user to access and use the service. As discussed herein, the prepared message may then be sent or otherwise provided to the user (act 612). For instance, the message may be sent as an email to a user. In another embodiment, a message may be provided using a phone number (e.g., as a text message or as part of a phone call). In still another embodiment, sending the message in act 612 may include sending all or a portion of the message to a control panel of the automation system. Optionally, if the user has already begun using the enhanced service identified in act 602, the method 600 may bypass sending of the message in act 612, and the method 600 may end (act 618).

In some embodiments, performance of the method 600 may determine in act 606 that an enhanced service is not currently available to a user. In that case, the method 600 may end at act 618. Alternatively, and as shown in FIG. 6, the method 600 may instead determine whether an upgrade or change to the automation system is available to allow the user to use the enhanced service (act 614). If such an upgrade is available, a message may be prepared (act 616) and sent to the user (act 612). For instance, a message may identify the service and what upgrade is needed to take advantage of the service. Any actions the user need take to complete the upgrade, a cost of the upgrade, or other information may also be part of the message. Alternatively, some or all of the information may be excluded and instead provided as a follow-up to the initial message, should the user respond with a request for more information.

Figure 7A:
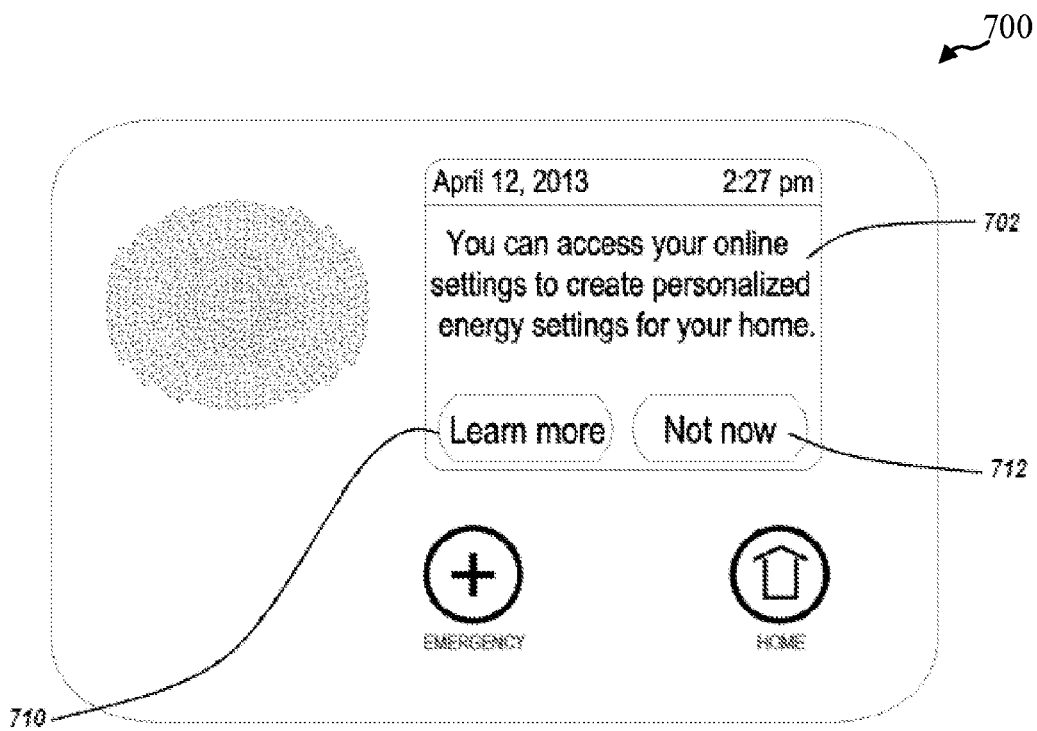
FIG. 7A illustrates an example control panel usable in connection with the methods of FIGS. 5 and 6 to provide a user of an automation system with information about an enhanced service, according to one embodiment of the present disclosure.
Figure 7B:
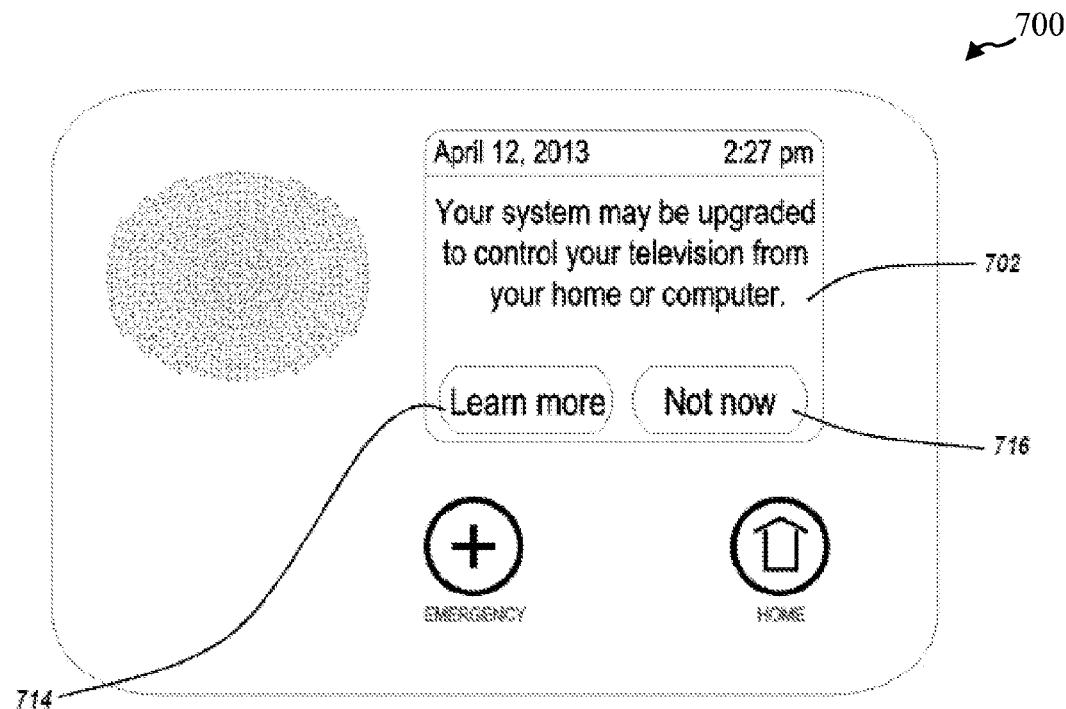
FIG. 7B illustrates the example control panel of FIG. 7A displaying information about available upgrades to an automation system and/or available enhanced services for the automation system, according to one embodiment of the present disclosure.

Examples of manners in which the method 600 may be implemented may be better understood with reference to FIGS. 7A and 7B. FIGS. 7A and 7B illustrate an example control panel 700 that includes a display 702 capable of displaying text, images, video, or other information provided as part of a message or prompt to a user. The control panel 700 may, but need not necessarily, include one or more aspects of control panel 200 of FIG. 2 and/or of control panel 400 of FIGS. 4A-4D, and may include the same, fewer, or additional features or capabilities.

As shown in FIG. 7A, a display 702 of the control panel 700 may include a message intended for a user or operator of the control panel 700. In this embodiment, the message indicates that a user may access an enhanced feature. More particularly, the illustrated message indicates that a user may be able to access an online service and create energy settings for the home.

The message on the display 702 may be displayed for any number of reasons. For instance, with reference to FIG. 6, the message may be displayed as a result of a determination that a user has not used, accessed, or registered for an enhanced service (act 608). In this particular embodiment, the enhanced service may be an online service or a service allowing the creation of energy settings or profiles. When it is determined that the user has not used either or both services, the message may be prepared and sent to the control panel 700. Of course, a similar message could additionally, or alternatively, be sent to another device, such as a computer, mobile phone, or the like.

Regardless of the reason the message is displayed on the display 702, the user may then be reminded of potential services available on account of the user's use of an automation system connected to the control panel 700. In some embodiments, the user may be given additional information to explain potential services. An input option 710 is shown in FIG. 7A as one example of a means or device for obtaining additional information on an enhanced service. In this particular embodiment, the input option 710 is displayed on the display 702, which may have touch-screen capabilities. Upon selection of the input option 710, the user may be given additional information on an online service, energy settings, or other features, or any combination of the foregoing. An input option 712 may optionally be provided. In this particular embodiment, the input option 712 may allow a user to dismiss a message, potentially without obtaining additional information on an available service. In other embodiments, however, the input option 712 may allow a user to still receive some information, albeit less than may be available through the input option 710. While input options 710, 712 are shown as inputs on a touch-sensitive display 702, such an embodiment is merely illustrative. In other embodiments, the input options 710, 712 may be replaced or supplemented through the use of physical buttons, or other input devices. Further, a single input option may be provided, or more than two input options 710, 712 may be provided.

Turning now to FIG. 7B, another example of the control panel 700 is illustrated. In this particular embodiment, the control panel 700 also includes a display 702 with a message thereon. The message may be received in any number of manners, and may include a variety of types of different content. In this particular embodiment, however, the content of the message may relate to services available to a user of the control panel 700. More particularly, the message in FIG. 7B indicates that enhanced services may be available by upgrading the control panel and/or corresponding automation system.

In particular, the message on the display 702 of FIG. 7B indicates that by upgrading an automation system, the user may have access to an additional enhanced service (e.g., control of television from a remote electronic device such as a computer, smart phone, etc.). Such a message may prompt a user to request the additional service or an additional component to the automation system in order to receive the service. As described elsewhere herein, optional input options 714, 716 may be provided in order to allow a user to obtain more information, dismiss the message, or the like. Example responses to selection of the input options 714, 716 may include presenting additional information about an upgrade (e.g., hardware or corresponding enhanced service), providing an interactive ordering or scheduling option to request the upgrade through the control panel or other device receiving the message, dismissing the message, requesting to be reminded later, or some other response, or any combination of the foregoing.

Figure 8:
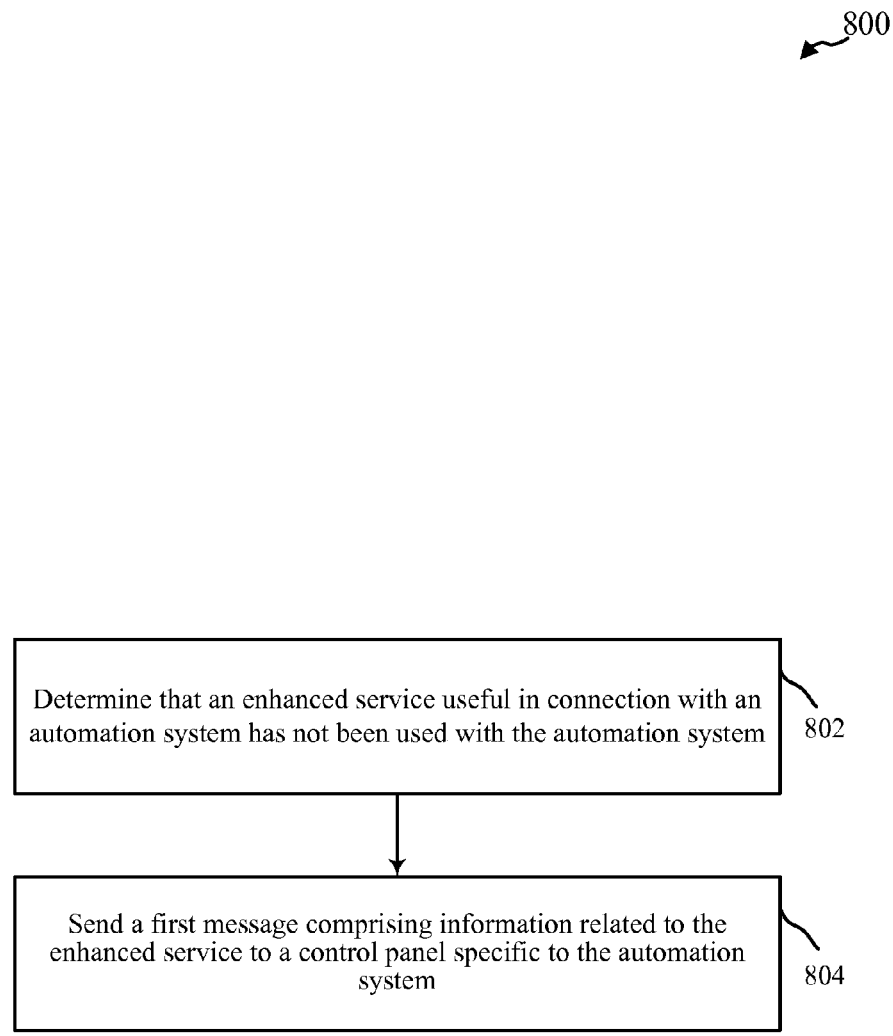
FIGS. 8-9 illustrate example flow diagrams of methods for prompting a user to register for an enhanced service for an automation system, according to one embodiment of the present disclosure.

In reference now to FIG. 8, another method 800 for prompting users to access and use enhanced services associated with an automation system. The method 800 may include one or more aspects of method 300 of FIG. 3, method 500 of FIG. 5, and/or method 600 of FIG. 6. Method 800 may be performed, for example, by NOC 120, web portal 121, or the like. The acts and steps of method 800 are intended to provide an example of a method in accordance with embodiments of the present disclosure, and are not intended to be limited to only the method of FIG. 8, nor to exclude other suitable acts or steps as described herein.

First, at act 802, it may be determined that an enhanced service useful in connection with an automation system has not been used with the automation system. This may include reviewing registration information for a web portal or other remote access service to determine if a customer has completed a registration process. A look-up may be used by identifying the customer, the control panel, an automation system component, or in any other suitable manner.

Next, at act 804 a first message comprising information related to the enhanced service may be sent to a control panel specific to the automation system. As an example, a provider of the remote access service may send a message to the control panel as a follow-up to remind the user that a remote access service is available, and potentially how to register for the service. In this way a user of the control panel, which may be any of control panels 200, 400, and/or 700 described above, may be notified that an enhanced service associated with an automation system is available to the user. The information may include instructions for accessing and/or activating the enhanced service.

Figure 9:
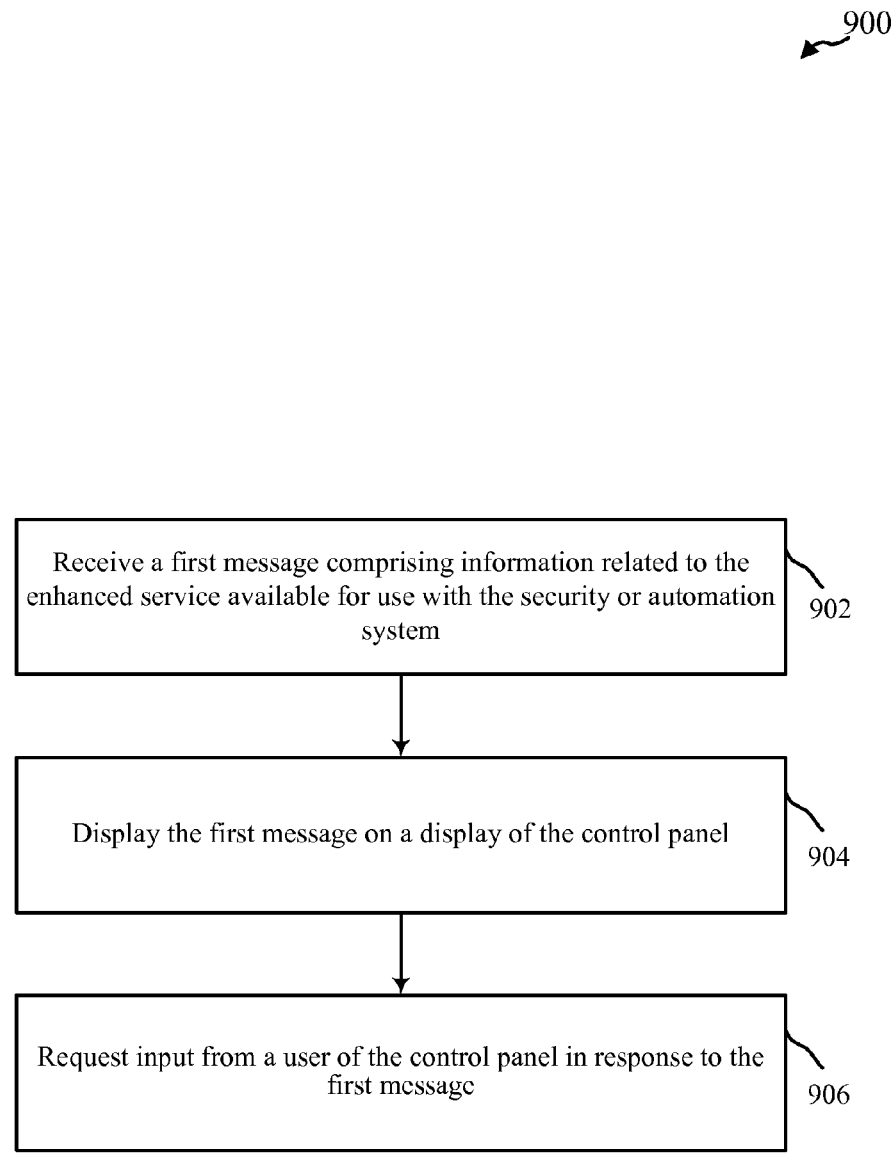

In reference now to FIG. 9, another method 900 for prompting users to access and use enhanced services associated with an automation system. The method 900 may include one or more aspects of method 300 of FIG. 3, method 500 of FIG. 5, and/or method 600 of FIG. 6. Method 900 may be performed, for example, by a control panel, such as any of control panels 200, 400, and/or 700 described above in reference to previous Figures. The acts and steps of method 900 are intended to provide an example of a method in accordance with embodiments of the present disclosure, and are not intended to be limited to only the method of FIG. 9, nor to exclude other suitable acts or steps as described herein.

First, at act 902, a control panel of a security or automation system may receive a first message comprising information related to the enhanced service available for use with the security or automation system. Next, at act 904, the control panel may display the first message on a display of the control panel. At act 906, the control panel may request input from a user of the control panel in response to the first message. In some embodiments, the first message displayed on a display of the control panel may include the display 402 of control panel 400 described above in reference to FIG. 4B. In one aspect, the control panel requesting input from the user may include inputs 410 and/or 412 of the display of control panel 400 described in reference to FIG. 4B. In one aspect, the control panel requesting input from the user may include the display 402 of control panel 400 described in reference to FIG. 4C.

In some embodiments, the first message displayed on a display of the control panel may include the display 702 of control panel 700 described above in reference to FIG. 7A. In one aspect, the control panel requesting input from the user may include inputs 710 and/or 712 of the display of control panel 4-700 described in reference to FIG. 7A. In the above ways, a user may be informed of the availability of one or more enhanced services associated with a security or automation system via a control panel of the security or automation system.

Embodiments of the present disclosure may comprise or utilize a special purpose or general-purpose computer including computer hardware, such as, for example, one or more processors and system memory. Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the disclosure can comprise at least two distinctly different kinds of computer-readable media, including at least computer storage media and/or transmission media. Computer-readable media that includes computer-executable instructions may also be referred to as a computer program product.

Examples of computer storage media include RAM, ROM, EEPROM, CD-ROM or other optical disk storage, magnetic disk storage or other magnetic storage devices, flash-based storage, solid-state storage, or any other physical, non-transmission medium which can be used to store desired program code means in the form of computer-executable instructions or data structures and which can be accessed by a general purpose or special purpose computer.

When information is transferred or provided over a communication network or another communications connection (either hardwired, wireless, or a combination of hardwired or wireless) to a computing device, the computing device properly views the connection as a transmission medium. A "communication network" may generally be defined as one or more data links that enable the transport of electronic data between computer systems and/or modules, engines, and/or other electronic devices, and transmissions media can include a communication network and/or data links, carrier waves, wireless signals, and the like, which can be used to carry desired program or template code means or instructions in the form of computer-executable instructions or data structures within, to or from a communication network. Combinations of storage media and transmission media should also be included within the scope of computer-readable media.

Further, upon reaching various computer system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise instructions and data which, when executed at a processor, cause a general purpose computer, dedicated or special purpose computer (e.g., an automation system control panel), or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above, nor performance of the described acts or steps by the components described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, programmable logic machines, multi-processor systems, microprocessor-based or programmable consumer electronics, network PCs, tablet computing devices, minicomputers, automation system control panels, network operations centers, mainframe computers, mobile telephones, PDAs, pagers, routers, switches, and the like.

Embodiments may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices.

Those skilled in the art will also appreciate that embodiments of the present disclosure may be practiced in special-purpose, dedicated or other computing devices integrated within or particular to a particular residence, business, company, government agency, or other entity, and that such devices may operate using one or more network, wireless, hardwire, or other connections, or any combination thereof. Examples may include residential or commercial buildings in connection with security or other automation systems configured to monitor local conditions (i.e., within a specific range of the building), remote conditions (i.e., accessible regardless whether within a particular range), or some combination thereof.

Although the foregoing description contains many specifics, these should not be construed as limiting the scope of the disclosure or of any of the appended claims, but merely as providing information pertinent to some specific embodiments that may fall within the scopes of the disclosure and the appended claims. Various embodiments are described, some of which incorporate differing features. Any feature illustrated or described relative to one embodiment is interchangeable and/or may be employed in combination with features of any other embodiment herein. In addition, other embodiments may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

What is claimed is:

1. A method for prompting an automation system user to use one or more enhanced services, comprising:
   identifying an automation system and one or more enhanced services useful in connection with the automation system;
   determining, via a service provider associated with the automation system, that the user has registered for one or more of the enhanced services, and further determining that the registered user has never used one or more of the enhanced services or that the registered user has not used one or more of the enhanced services for a predetermined period of time; and
   sending a first message received from the service provider to a control panel specific to the automation system, based at least in part on the determining, the first message comprising information related to using the one or more enhanced services.

2. The method recited in claim 1, wherein the one or more enhanced services comprises an interactive service providing remote access to the automation system.

3. The method of claim 2, wherein the interactive service further provides one or more of remote control and monitoring of security automation components of the automation system.

4. The method recited in claim 1, further comprising sending a second message directed to the automation system user, the second message comprising information related to the one or more enhanced services.

5. The method recited in claim 4, wherein sending the second message includes sending the second message to an email address or mobile phone of the automation system user.

6. The method recited in claim 1, further comprising:
   determining that an enhanced service is available in connection with the automation system.

7. The method recited in claim 1, wherein the first message requests that the user input contact information.

8. The method recited in claim 7, wherein the contact information includes one or more of a phone number or an email address.

9. The method recited in claim 7, further comprising:
   receiving a response to the first message, the response comprising contact information inputted by the user; and
   sending a second message using the contact information of the user, the second message providing information for using or accessing the one or more enhanced services in connection with the automation system.

10. The method recited in claim 9, wherein sending the second message includes sending one or more of a text message, an email message, or an alert through an application.

11. The method recited in claim 9, wherein the second message includes one or more of a link to the one or more enhanced services, a link to a mobile application, the mobile application being available for download to provide access to the one or more enhanced services, or the mobile application.

12. The method recited in claim 11, wherein the link includes one or more of a hyperlink, a bar code, or a quick response (QR) code.

13. A method for prompting a user to use one or more enhanced services available for a security or automation system, comprising:

at a control panel of the security or automation system, identifying the one or more enhanced services useful in connection with the security or automation system;

at the control panel, determining, via a service provider associated with the security or automation system, that the user has registered for one or more of the enhanced services, and further determining that the registered user has never used one or more of the enhanced services or that the registered user has not used one or more of the enhanced services for a predetermined period of time;

receiving a first message, based at least in part on the determining, the first message comprising information related to using the one or more enhanced services available for use with the security or automation system;

displaying the first message on a display of the control panel; and requesting input from the user of the control panel in response to the first message.

14. The method recited in claim 13, wherein the first message is received from a remote source.

15. The method recited in claim 14, wherein the remote source includes one or more of the service provider, a web portal, or a network operations center.

16. The method recited in claim 13, wherein displaying the first message comprises displaying one or more input options for receiving input from the user, the one or more input options comprising one or more of a telephone number field, an email address field, an option to dismiss the first message, an option to obtain more information related to the one or more enhanced services, or an option to register for the one or more enhanced services directly through the control panel.

17. The method recited in claim 13, wherein requesting input from the user of the control panel comprises requiring that the user provide the input in order to dismiss the first message.

18. A control panel, comprising:

one or more processors;

a display; and one or more non-transitory computer storage media having computer-executable instructions stored thereon that, when executed by the one or more processors, cause the control panel to perform the method of claim 13.

* * * * *